US012705094B2

(12) United States Patent
Zhou et al.

(10) Patent No.: US 12,705,094 B2
(45) Date of Patent: Aug. 11, 2026

(54) GRAPH COMPUTING APPARATUS, PROCESSING METHOD, AND RELATED DEVICE

(71) Applicant: HUAWEI TECHNOLOGIES CO., LTD., Shenzhen (CN)

(72) Inventors: Ruoyu Zhou, Shenzhen (CN); Fan Zhu, Shenzhen (CN); Wenbo Sun, Hangzhou (CN); Xiping Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 693 days.

(21) Appl. No.: 18/171,189

(22) Filed: Feb. 17, 2023

(65) Prior Publication Data

US 2023/0195526 A1 Jun. 22, 2023

Related U.S. Application Data

(63) Continuation of application No. PCT/CN2020/110517, filed on Aug. 21, 2020.

(51) Int. Cl.
*G06F 9/48* (2006.01)
*G06F 9/30* (2018.01)
*G06F 9/50* (2006.01)

(52) U.S. Cl.
CPC ........ *G06F 9/4881* (2013.01); *G06F 9/30076* (2013.01); *G06F 9/48* (2013.01);
(Continued)

(58) Field of Classification Search
CPC ........ G06F 9/48; G06F 9/4806; G06F 9/4843; G06F 9/4881; G06F 9/50; G06F 9/5005;
(Continued)

(56) References Cited

U.S. PATENT DOCUMENTS

2014/0101673 A1* 4/2014 Klyuchevskyy ...... G06F 9/4881 718/106
2016/0232006 A1 8/2016 Wright
(Continued)

OTHER PUBLICATIONS

Chen et al., "Function Units Sharing between Neighbor Cores in CMP," Proceedings of 16th European Conference-Computer Vision, May 21, 2010, 13 pages.
(Continued)

*Primary Examiner* — Charles M Swift
(74) *Attorney, Agent, or Firm* — Fish & Richardson P.C.

(57) ABSTRACT

Embodiments of this application disclose apparatuses, processing methods, and related devices. An example apparatus includes at least one processing engine (PE), and each of the at least one PE includes M status buffers, an arbitration logic circuit, and X operation circuits. Each of the M status buffers is configured to store status data of one iterative computing task. The arbitration logic circuit is configured to determine, based on the status data in the each of the M status buffers, L graph computing instructions to be executed in a current clock cycle, and allocate the L graph computing instructions to the X operation circuits. Each of the X operation circuits is configured to execute a graph computing instruction allocated by the arbitration logic circuit.

20 Claims, 21 Drawing Sheets

(52) U.S. Cl.
CPC .......... *G06F 9/4806* (2013.01); *G06F 9/4843* (2013.01); *G06F 9/50* (2013.01); *G06F 9/5005* (2013.01); *G06F 9/5044* (2013.01); *G06F 9/5061* (2013.01); *G06F 9/5066* (2013.01)

(58) Field of Classification Search
CPC .... G06F 9/5044; G06F 9/5061; G06F 9/5066; G06F 9/30065; G06F 9/30076; G06F 9/3836
See application file for complete search history.

(56) References Cited

U.S. PATENT DOCUMENTS

| | | | | |
|---|---|---|---|---|
| 2020/0293366 | A1* | 9/2020 | Margetts | G06F 9/4881 |
| 2020/0293372 | A1* | 9/2020 | Haprian | G06F 11/3006 |
| 2021/0109779 | A1* | 4/2021 | Kleine | G06F 9/4887 |

OTHER PUBLICATIONS

Pan et al., "CongraPlus: Towards Efficient Processing of Concurrent Graph Queries on NUMA Machines," IEEE Transactions On Parallel And Distributed Systems, Sep. 11, 2019, 13 pages.
Extended European Search Report in European Appln. No. 20949898.9, mailed on Jul. 25, 2023, 11 pages.

* cited by examiner

Cycles In Graphflow
(cycle in graph computing)

Small Cycle-Long Side DAG
(small cycle-long edge directed acyclic graph)

- Specially mark a data flow across sub-elements
- A data flow flows in three-dimensional space, not in second-dimensional space

Graphflow Across

Prevent Future Iterations to Commit (Prevent submission of a further iteration)

GRAPH COMPUTING APPARATUS, PROCESSING METHOD, AND RELATED DEVICE

CROSS-REFERENCE TO RELATED APPLICATIONS

This application is a continuation of International Application No. PCT/CN 2020/110517, filed on Aug. 21, 2020, the disclosure of which is hereby incorporated by reference in its entirety.

TECHNICAL FIELD

The present application relates to the field of directed graph computing technologies, and in particular, to a graph computing apparatus, a processing method, and a related device.

BACKGROUND

As a data scale and data operation complexity in each field increase continuously, higher requirements are imposed on a computing capability and processing performance of a processor. A conventional control flow (ControlFlow) architecture processor (Central Processing Unit, CPU) can perform instruction-level parallel operation in a single processor core, but cannot further improve performance of the single processor core. For example, there is a bottleneck in aspects such as a dominant frequency, power consumption, complexity, and memory. As a result, in a processor of a mobile phone, a server, a desktop computer, or the like, performance can be improved only by increasing a quantity of processor cores.

In contrast, a data flow (DataFlow) architecture processor is more efficient. For a control flow architecture, there is no instruction counter in a data flow architecture. An instruction execution time depends on whether an operand is available, and an execution sequence is determined by a dependency relationship between instructions. In other words, as long as there are enough operation units (Function Unit, FU) and instruction windows, all instructions that do not have data-related relationships with each other can be executed in parallel. This greatly improves instruction parallelism.

For example, for a hotspot cyclic iteration instruction, a hotspot instruction sequence, a repeatedly executed instruction sequence, and the like, computation is performed by using the foregoing data flow manner. An instruction may be repeatedly executed in the data flow architecture processor, to reduce a quantity of times and bandwidth of fetching an instruction from a memory by a processor core, and reduce overheads of checking a dependency relationship between instructions, jump prediction, register access, and the like. This effectively utilizes computing resources of the processor, and improves performance of the processor. However, in a conventional data flow architecture, due to blocking of some instructions, instructions that have a dependency relationship with the instructions may not be normally executed. Consequently, instruction execution efficiency is greatly reduced.

Therefore, how to further improve CPU performance in the general computing field by using the foregoing advantages of the data flow architecture becomes an urgent technical problem that needs to be resolved currently.

SUMMARY

Embodiments of the present application provide a graph computing apparatus, a processing method, and a related device, to improve instruction execution efficiency in directed graph computing.

According to a first aspect, an embodiment of the present application provides a graph computing apparatus. The graph computing apparatus includes at least one processing engine PE, and each of the at least one PE includes M status buffers, an arbitration logic unit, and X operation units. M is an integer greater than 1, and X is an integer greater than or equal to 1. Each of the M status buffers is configured to store status data of one iterative computing task. The one iterative computing task is one of N iterative computing tasks included in a graph computing task, and N is an integer greater than 1. The arbitration logic unit is configured to: determine, based on status data in the M status buffers, L graph computing instructions to be executed in a current clock cycle, and allocate the L graph computing instructions to the X operation units. The L graph computing instructions are instructions respectively corresponding to T iterative computing tasks, the N iterative computing tasks include the T iterative computing tasks, and both L and T are integers greater than or equal to 1 and less than or equal to X. Each of the X operation units is configured to execute the graph computing instruction allocated by the arbitration logic unit.

In this embodiment of the present application, a plurality of status buffers are disposed in the processing engine PE of the graph computing apparatus, and each status buffer is configured to store status data of one iterative computing task of the graph computing task. In this way, status data of different iterative computing tasks may be independently and separately stored in different status buffers without interfering with each other. Therefore, a graph computing instruction in any iterative computing task does not need to be limited by an execution progress of a previous iterative computing task, and can be executed as long as input data of the graph computing instruction arrives. This ensures parallelism of a plurality of iterative computing tasks, and improves execution efficiency of the graph computing task. This resolves a technical problem in a conventional technology that another part or even all of graph computing instructions are blocked due to blocking of a graph computing instruction in an iterative computing task. In conclusion, in this embodiment of the present application, from a perspective of hardware, it is assumed that instructions of a plurality of iterative computing tasks are repeated but input data is different. Therefore, in a compilation phase, a dependency relationship between iterations of iterative computing tasks in a graph computing task is determined, and a plurality of status buffers are further used for hardware expansion on a plurality of iteration loops of the graph computing task. In addition, a cross-iteration instruction dependency relationship is established by using a data flow plus a control flow that use a same idea as a graph computing architecture. Finally, graph computing instructions in different iterative computing tasks can be simultaneously executed after the cross-iteration dependency relationship is complied with. This improves execution efficiency of the graph computing task from a dimension of cross-iteration parallelism, and further improves performance of a processor.

In a possible implementation, the graph computing task includes P graph computing instructions. The apparatus further includes an instruction buffer. The instruction buffer is configured to store the P graph computing instructions. The N iterative computing tasks share the P graph computing instructions.

In this embodiment of the present application, because executed graph computing instructions in different iterative computing tasks may be considered to be the same, but input data is different, in this embodiment of the present application, the P computing instructions included in the graph computing task are stored in the shared instruction buffer, to save storage space and instruction space. That is, only one copy of the P graph computing instructions needs to be stored without a need of expanding N copies like the status data of the iterative computing task. This reduces storage overheads in a process of executing the graph computing task.

In a possible implementation, the graph computing task includes the P graph computing instructions. The status data of the one iterative computing task includes input data of the P graph computing instructions in a corresponding iterative computing task. The arbitration logic unit is specifically configured to: monitor whether the input data that is of the P graph computing instructions in the corresponding iterative computing task and that is in the M status buffers is ready; select, from graph computing instructions whose current input data is ready, L graph computing instructions corresponding to the earliest T iterative computing tasks in the corresponding iterative computing task, where one or more graph computing instructions are selected from one iterative computing task; and allocate, from the instruction buffer, the L graph computing instructions to L operation units in the X operation units, where one operation unit corresponds to one graph computing instruction.

In this embodiment of the present application, the arbitration logic unit monitors status data currently stored in the M status buffers. When input data of a part of graph computing instructions in each status buffer is ready, the arbitration logic unit may select, from the part of graph computing instructions, the L graph computing instructions whose input data is ready, and send the L graph computing instructions to the operation unit for execution in the current clock cycle. According to a selection rule, ready graph computing instructions in L earlier-iterated iterative computing tasks are preferentially selected, to ensure overall execution efficiency of the graph computing task. It should be noted that T and L may be equal or may not be equal, that is, one graph computing instruction may be selected in one iterative computing task, or a plurality of graph computing instructions may be selected. That is, in each clock cycle, a maximum of X graph computing instructions may be selected from M iterative computing tasks corresponding to the M status buffers, and are separately allocated to the X operation units for computation, that is, one operation unit corresponds to one graph computing instruction in one clock cycle. Certainly, it may be understood that, when a quantity of graph computing instructions whose current input data is ready is insufficient (that is, less than X), graph computing instructions of iterative computing tasks whose quantity of iterations is less than X may be selected and allocated to T operation units. In this case, an operation unit is in an idle state.

In a possible implementation, the processing engine further includes a writeback unit. The X operation units are separately connected to the writeback unit. Each of the X operation units is further configured to send, to the writeback unit, a computation result obtained by executing the graph computing instruction.

In this embodiment of the present application, any processing engine in the graph computing apparatus further includes a writeback unit. The writeback unit is separately connected to X operation units in the processor engine. Each of the X operation units executes the graph computing instruction and obtains a corresponding computation result, and sends the computation result to the writeback unit. In this way, the writeback unit writes the computation result back to a corresponding location in a corresponding status buffer based on a result address corresponding to the computation result. Therefore, a data dependency relationship between instructions in an iterative computing task of the graph computing task and a data dependency relationship between different iterative computing tasks are established.

In a possible implementation, the graph computing instruction includes an intra-iteration graph computing instruction. The intra-iteration graph computing instruction carries a result address. The writeback unit is configured to send an $i^{th}$ iterative computation result to a result address in a status buffer corresponding to an $i^{th}$ iterative computing task. A value range of i is a positive integer less than or equal to N. The $i^{th}$ iterative computation result is a result obtained by executing the intra-iteration graph computing instruction in the $i^{th}$ iterative computing task in the N iterative computing tasks.

In this embodiment of the present application, the graph computing task includes an intra-iteration graph computing instruction. The intra-iteration graph computing instruction includes a result address to which a computation result finally points, that is, the result address (for example, used as input data of another graph computing instruction in the current iterative computing task) to which the computation result obtained by the graph computing instruction needs to be transferred. After an intra-iteration graph computing instruction in an iterative computing task of the graph computing task is executed by the operation unit, the writeback unit sends, based on the intra-iteration graph computing instruction, a computation result of the intra-iteration graph computing instruction to a status buffer in which status data of the iterative computing task is stored, to execute another instruction that has a data dependency relationship with the intra-iteration graph computing instruction and that is in the iterative computing task. That is, for any one iterative computing task of the graph computing task, when an intra-iteration graph computing instruction is executed, a computation result of the graph computing instruction is fed back to a status buffer in which status data of the iterative computing task is stored. In this way, a related instruction in the iterative computing task continues to use the computation result as data input for execution.

In a possible implementation, the graph computing instruction includes a cross-iteration graph computing instruction. The cross-iteration graph computing instruction carries a result address and a cross-iteration identifier. The writeback unit is configured to send, based on the cross-iteration identifier, an $i^{th}$ iterative computation result to a result address in a status buffer corresponding to an (i+1)th iterative computing task. A value range of i is a positive integer less than or equal to N−1. The $i^{th}$ iterative computation result is a result obtained by executing the cross-iteration graph computing instruction in the $i^{th}$ iterative computing task in the N iterative computing tasks.

In this embodiment of the present application, the graph computing task includes a cross-iteration graph computing instruction. The cross-iteration graph computing instruction includes a result address to which a computation result finally points, that is, the result address (for example, used as input data of another graph computing instruction in a next iterative computing task) to which the computation result obtained by the graph computing instruction needs to be transferred. After an intra-iteration graph computing instruction in an iterative computing task of the graph computing task is executed by the operation unit, the write-back unit sends, based on the intra-iteration graph computing instruction, a computation result of the intra-iteration graph computing instruction to a status buffer in which status data of a next iterative computing task of the iterative computing task is stored, to execute another instruction that has a data dependency relationship with the intra-iteration graph computing instruction and that is in the next iterative computing task. That is, for any one iterative computing task of the graph computing task, when a cross-iteration graph computing instruction is executed, a computation result of the graph computing instruction is fed back to a status buffer in which status data of a next iterative computing task of the iterative computing task is stored. In this way, a related instruction in the next iterative computing task continues to use the computation result as data input for execution.

In a possible implementation, the writeback unit is specifically configured to: when computation results corresponding to a plurality of iterative computing tasks need to be separately written back to corresponding status buffers, preferentially write a computation result corresponding to an earlier-iterated iterative computing task back to a status buffer corresponding to the iterative computing task with the earlier iteration.

In this embodiment of the present application, when the computation results corresponding to the plurality of iterative computing tasks need to be separately written back to the corresponding status buffers, the writeback unit preferentially writes a result of an earlier-iterated iterative computing task back to a corresponding status buffer, to complete the iterative computing task with the earlier iteration as early as possible, and start a new iterative computing task and complete the N iterative computing tasks of the graph computing task as soon as possible. Because the graph computing task includes the N iterative computing tasks, and usually, a value of N is large and a value of X is small, a plurality of iterative computing tasks may be executed to complete the N iterative computing tasks of the graph computing task. However, during replacement of status data of the plurality of iterative computing tasks, data of a new iterative computing task can be loaded only after computation of an earlier iterative computing task is completed and corresponding status data is cleared. That is, if a computation result of an iterative computing task with an earlier (oldest) iteration is preferentially written back, the iterative computing task with the earlier (oldest) iteration can be completed and cleared more quickly. In this way, a new iterative computing task can be loaded into a status buffer as soon as possible. This improves overall execution efficiency of the graph computing task.

In a possible implementation, the graph computing instruction includes an iterative window movement instruction. Each status buffer is further configured to: when computation of a graph computing instruction in a $j^{th}$ iterative computing task is completed, clear, based on the iterative window movement instruction, status data in a status buffer corresponding to the $j^{th}$ iterative computing task, and load status data of a $(j+M)^{th}$ computing task into a cleared status buffer. The $j^{th}$ iterative computing task is an earliest iterative computing task in an iterative computing task currently corresponding to the M status buffers.

In this embodiment of the present application, because the quantity M of status buffers is limited, when the quantity N of iterative computing tasks included in the graph computing task is large, it may be understood that, the N iterative computing tasks can be completed only after a plurality of iterative computing tasks are executed. However, during replacement of status data of the plurality of iterative computing tasks, data of a new iterative computing task can be loaded only after computation of an earlier iterative computing task is completed and corresponding status data is cleared. However, in this embodiment of the present application, when computation of the graph computing instruction in the $j^{th}$ iterative computing task is completed, based on a parallel processing width M in this embodiment of the present application, the status data of the earliest iterative computing task that is not executed currently, that is, the $(j+M)^{th}$ computing task, may be loaded into the cleared status buffer, to form a sliding window whose width is M. Therefore, when the earliest iterative computing task completes its computation, status data of a latest iterative computing task outside the window may be loaded, to form cross-iteration window movement with a width of M, and in a process of window movement, to complete execution of the N iterative computing tasks of the graph computing task.

In a possible implementation, the writeback unit is further configured to: before the status data of the $(j+M)^{th}$ computing task is loaded into the cleared status buffer, forbid sending a computation result of a $(j+M-1)^{th}$ iterative computing task to the status buffer corresponding to the $(j+M)^{th}$ iterative computing task; and after the status data of the $(j+M)^{th}$ computing task is loaded into the cleared status buffer, allow sending the computation result of the $(j+M-1)^{th}$ iterative computing task to the status buffer corresponding to the $(j+M)^{th}$ iterative computing task.

In this embodiment of the present application, because a quantity M of status buffers is limited, when computation of the M iterative computing tasks corresponding to the M status buffers are not completed currently, status data of a new iterative computing task cannot be loaded. Therefore, a latest iterative computing task that is not computed can be loaded only after at least one of the M iterative computing tasks in the current round of iterative computing is completed. In addition, in this embodiment of the present application, each repeated execution of the graph computing task is referred to as one "iteration", and a result obtained by executing each iterative computing task is used as an initial value of a next iterative computing task. That is, there is a direct data dependency relationship between two consecutive iterative computing tasks. Therefore, based on an association relationship between iterations, in this embodiment of the present application, status data of a latest iterative computing task that is not computed is loaded only when execution of a current earliest (oldest) iterative computing task is completed, to ensure that the M iterative computing tasks in the M status buffers are always continuous. This avoids a computation disorder caused by that an instruction window cannot move based on an oldest (oldest) status buffer because of discontinuity between M parallel iterative tasks, and improves overall computation efficiency of the graph computing task.

In a possible implementation, the graph computing instruction includes a computation end instruction. Each status buffer is further configured to: when computation of an $N^{th}$ iterative computing task in the N iterative computing tasks is completed, clear, based on the computation end instruction, status data of an iterative computing task that exceeds the $N^{th}$ iterative computing task, and exit a loop.

In this embodiment of the present application, when the $N^{th}$ iterative computing task is computed, if no computation end instruction is received, the cyclic iterative computing task may continue to be executed, that is, an expected quantity of iterations is exceeded, and an overflow effect of instruction execution is generated. Therefore, in this embodiment of the present application, the computation end instruction is for clearing related data of an overflowed iterative computing task while instructing the graph computing task to suspend computation, to avoid a computation result error caused by an overflow effect of executing the iterative computing task.

According to a second aspect, an embodiment of the present application provides a processing method, applied to a graph computing apparatus. The graph computing apparatus includes at least one processing engine PE, and each of the at least one PE includes M status buffers, an arbitration logic unit, and X operation units. M is an integer greater than 1, and X is an integer greater than or equal to 1. Each of the M status buffers stores status data of one iterative computing task. The one iterative computing task is one of N iterative computing tasks included in a graph computing task, and Nis an integer greater than 1. The method may include: determining, based on status data in the M status buffers by using the arbitration logic unit, L graph computing instructions to be executed in a current clock cycle, and allocating the L graph computing instructions to the X operation units, where the L graph computing instructions are instructions respectively corresponding to T iterative computing tasks, the N iterative computing tasks include the T iterative computing tasks, and both L and T are integers greater than or equal to 1 and less than or equal to X; and executing, by using the X operation units, the graph computing instruction allocated by the arbitration logic unit.

In a possible implementation, the graph computing task includes P graph computing instructions. The apparatus further includes an instruction buffer. The instruction buffer stores the P graph computing instructions. The N iterative computing tasks share the P graph computing instructions.

In a possible implementation, the graph computing task includes the P graph computing instructions. The status data of the one iterative computing task includes input data of the P graph computing instructions in a corresponding iterative computing task. The determining, based on status data in the M status buffers by using the arbitration logic unit, L graph computing instructions to be executed in a current clock cycle, and allocating the L graph computing instructions to the X operation units includes: monitoring, by using the arbitration logic unit, whether the input data that is of the P graph computing instructions in the corresponding iterative computing task and that is in the M status buffers is ready; selecting, from graph computing instructions whose current input data is ready, L graph computing instructions corresponding to the earliest T iterative computing tasks in the corresponding iterative computing task, where one or more graph computing instructions are selected from one iterative computing task; and allocating, from the instruction buffer, the L graph computing instructions to L operation units in the X operation units, where one operation unit corresponds to one graph computing instruction.

In a possible implementation, the graph computing task includes the P graph computing instructions. The status data of the one iterative computing task of the graph computing task includes input data of the P graph computing instructions in an iterative computing task to which the P graph computing instructions belong. The determining, based on status data in the M status buffers by using the arbitration logic unit, L graph computing instructions to be executed in a current clock cycle, and allocating the L graph computing instructions to the X operation units includes: monitoring, by using the arbitration logic unit, whether the input data that is required by the P graph computing instructions separately corresponding to the iterative computing task and that currently corresponds to the M status buffers is ready; selecting, from graph computing instructions whose current instruction input data is ready, L graph computing instructions corresponding to the earliest T iterative computing tasks in the iterative computing task to which the current instruction belongs, where one or more graph computing instructions are selected from one iterative computing task; and allocating the L graph computing instructions to L operation units in the X operation units, where one operation unit corresponds to one graph computing instruction.

In a possible implementation, the processing engine further includes a writeback unit. The X operation units are separately connected to the writeback unit. The method further includes: sending, to the writeback unit by using the X operation units, a computation result obtained by executing the graph computing instruction.

In a possible implementation, the graph computing instruction includes an intra-iteration graph computing instruction. The intra-iteration graph computing instruction carries a result address. The method further includes: sending, by using the writeback unit, an $i^{th}$ iterative computation result to a result address in a status buffer corresponding to an $i^{th}$ iterative computing task. A value range of i is a positive integer less than or equal to N. The $i^{th}$ iterative computation result is a result obtained by executing the intra-iteration graph computing instruction in the $i^{th}$ iterative computing task in the N iterative computing tasks.

In a possible implementation, the graph computing instruction includes a cross-iteration graph computing instruction. The cross-iteration graph computing instruction carries a result address and a cross-iteration identifier. The method further includes: sending, based on the cross-iteration identifier by using the writeback unit, an $i^{th}$ iterative computation result to a result address in a status buffer corresponding to an $(i+1)^{th}$ iterative computing task. A value range of i is a positive integer less than or equal to N−1. The $i^{th}$ iterative computation result is a result obtained by executing the cross-iteration graph computing instruction in the $i^{th}$ iterative computing task in the N iterative computing tasks.

In a possible implementation, when computation results corresponding to a plurality of iterative computing tasks need to be separately written back to corresponding status buffers, the writeback unit preferentially writes a computation result corresponding to an earlier-iterated iterative computing task back to a status buffer corresponding to the iterative computing task with the earlier iteration.

In a possible implementation, the graph computing instruction includes an iterative window movement instruction. The method further includes: when computation of a graph computing instruction in a $j^{th}$ iterative computing task is completed, clearing, based on the iterative window movement instruction by using the M status buffers, status data in a status buffer corresponding to the $j^{th}$ iterative computing task, and loading status data of a $(j+M)^{th}$ computing task into a cleared status buffer. The $j^{th}$ iterative computing task is an earliest iterative computing task in an iterative computing task currently corresponding to the M status buffers.

In a possible implementation, the method further includes: before the status data of the $(j+M)^{th}$ computing task is loaded into the cleared status buffer, forbidding, by using the writeback unit, sending a computation result of a $(j+M-1)^{th}$ iterative computing task to the status buffer corresponding to the $(j+M)^{th}$ iterative computing task; and after the status data of the $(j+M)^{th}$ computing task is loaded into the cleared status buffer, allowing, by using the writeback unit, sending the computation result of the $(j+M-1)^{th}$ iterative computing task to the status buffer corresponding to the $(j+M)^{th}$ iterative computing task.

In a possible implementation, the graph computing instruction includes a computation end instruction. The method further includes: when computation of an $N^{th}$ iterative computing task in the N iterative computing tasks is completed, clearing, based on the computation end instruction by using the M status buffers, status data of an iterative computing task that exceeds the $N^{th}$ iterative computing task, and exiting a loop.

According to a third aspect, this application provides a semiconductor chip. The semiconductor chip may include the graph computing apparatus according to any implementation of the first aspect.

According to a fourth aspect, this application provides a semiconductor chip. The semiconductor chip may include the graph computing apparatus according to any implementation of the first aspect, and an internal memory and an external memory that are coupled to the graph computing apparatus.

According to a fifth aspect, this application provides a system on chip SoC chip. The SoC chip includes the graph computing apparatus according to any implementation of the first aspect, and an internal memory and an external memory that are coupled to the graph computing apparatus. The SoC chip may include a chip, or may include a chip and another discrete device.

According to a sixth aspect, this application provides a chip system. The chip system includes the graph computing apparatus according to any implementation of the first aspect. In a possible design, the chip system further includes a memory. The memory is configured to store program instructions and data that are necessary or related to the graph computing apparatus in a running process. The chip system may include a chip, or may include a chip and another discrete device.

According to a seventh aspect, this application provides a processing apparatus. The processing apparatus has a function of implementing any processing method in the second aspect. The function may be implemented by hardware, or may be implemented by hardware executing corresponding software. The hardware or the software includes one or more modules corresponding to the function.

According to an eighth aspect, this application provides a processor. The processor includes the graph computing apparatus according to any implementation of the first aspect. The processor may further include another functional unit, such as an instruction fetch unit, an instruction decode unit, and an instruction dispatch unit. The functional unit is configured to be coupled to the graph computing apparatus, to execute a general computing task or a graph computing task.

According to a ninth aspect, this application provides a terminal. The terminal includes a processor, and the processor includes the graph computing apparatus according to any implementation of the first aspect. The terminal may further include a memory, and the memory is configured to be coupled to the processor and stores necessary program instructions and data of the terminal. The terminal may further include a communication interface, configured to perform communication between the terminal and another device or communication network.

According to a tenth aspect, this application provides a computer-readable storage medium. The computer-readable storage medium stores a computer program. When the computer program is executed by a graph computing apparatus, the processing method procedure according to any one of the second aspect is implemented.

According to an eleventh aspect, an embodiment of the present application provides a computer program. The computer program includes instructions. When the computer program is executed by a graph computing apparatus, the graph computing apparatus is enabled to perform the processing method procedure according to any one of the second aspect.

DESCRIPTION OF EMBODIMENTS

Figure 1:
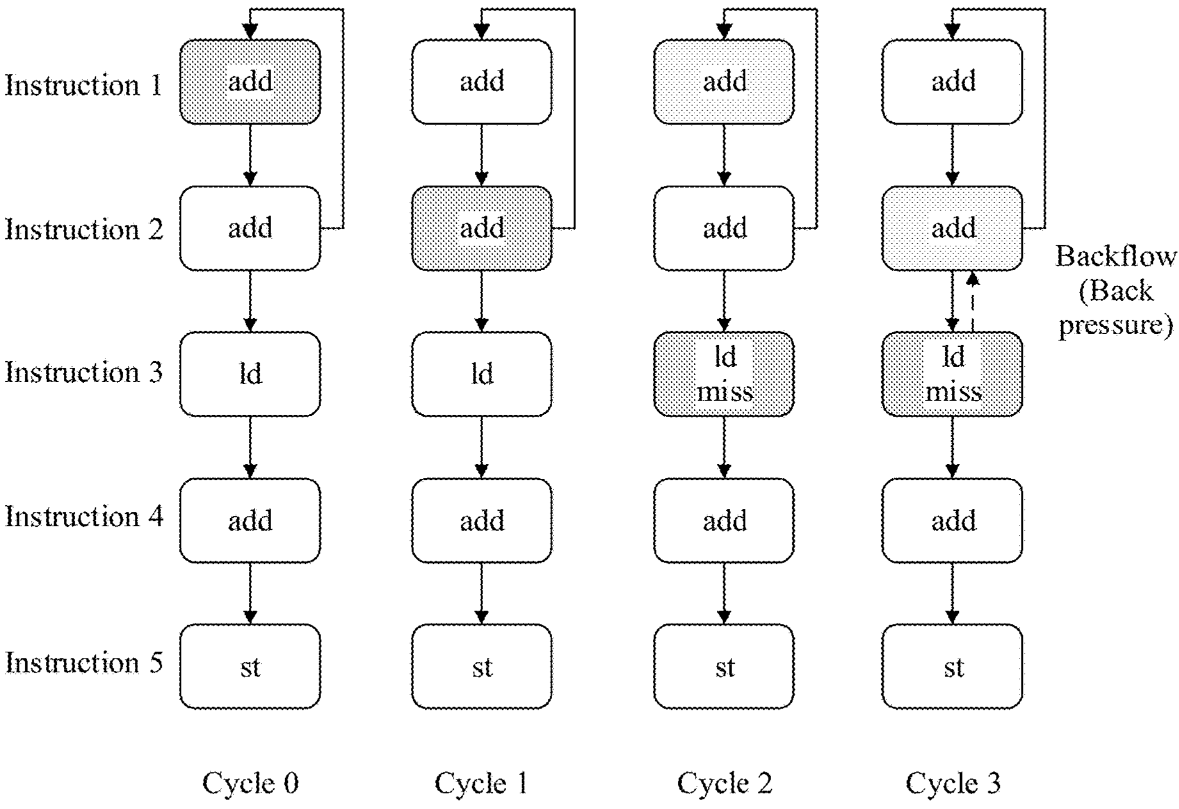
FIG. 1 is an example of cyclic computation in a static data flow architecture in the conventional technology.

The following describes embodiments of the present application with reference to the accompanying drawings in embodiments of the present application.

In this application, terms such as "first", "second", "third", and "fourth" in the specification, the claims, and the accompanying drawings are intended to distinguish between different objects but do not indicate a specific order. In addition, terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"Embodiment" mentioned in this specification means that a particular feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both an application that runs on a computing device and the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as an internet interacting with other systems by using the signal).

Some terms in this application are first described, to help a person skilled in the art have a better understanding.

(1) A graph (Graph) is an abstract data structure used for representing an association relationship between objects. A vertex (Vertex) and an edge (Edge) are used for description. The vertex represents an object, and the edge represents a relationship between objects.

(2) A superscalar (superscalar) processor architecture implements a form of parallelism operations called instruction level parallelism within a single processor core. This technology allows faster CPU throughput (throughput) at a same CPU primary frequency.

(3) A single-instruction multiple-data flow (Single Instruction Multiple Data, SIMD) is a group of instruction sets that can copy a plurality of operands and pack them in a large register.

(4) An instruction pipeline is a manner in which an operation of an instruction is divided into a plurality of small steps, and each step is completed by a dedicated circuit, to improve instruction execution efficiency of a processor. For example, an instruction needs to be executed in three phases: instruction fetching, decoding, and execution. Each phase requires a machine cycle. If a pipeline technology is not used, the instruction execution requires three machine cycles. If the instruction pipeline technology is used, when the instruction completes "instruction fetching" and enters "decoding", the next instruction can perform "instruction fetching" at the same time. In this way, instruction execution efficiency is improved.

(5) An execution unit (Execution Unit, EU) is responsible for executing instructions, and actually has functions of both a controller and an operator.

(6) A register file (register file) is also known as a register stack. The register file is an array of a plurality of registers in a CPU and is usually implemented by a fast static random access memory (SRAM). The RAM has a dedicated read port and write port, and can concurrently access different registers through multiple channels.

(7) An integrated circuit (Integrated Circuit, IC) is a microelectronic device or component. Components and traces such as transistors, resistors, capacitors, and inductors required in a circuit are interconnected by using a given process. The components and traces are made on a small or several small semiconductor wafers or dielectric substrates, and then encapsulated in a tube shell to form a micro structure with a required circuit function. In other words, an IC chip is a chip made by placing an integrated circuit formed by a large quantity of micro-electronic components (the transistors, the resistors, and the capacitors) on a plastic substrate.

(8) In a directed acyclic graph (Directed Acyclic Graph, DAG), "directed" means that there is a direction, which should be exactly the same direction, and "acyclic" means that there is no closed loop. The directed acyclic graph is a loop-free directed graph. If there is a non-directed acyclic graph, and the graph from a point A to a point B can return to the point A through a point C, a loop is formed. If an edge direction from C to A is changed to from A to C, the graph becomes a directed acyclic graph. A quantity of spanning trees in the directed acyclic graph is equal to an indegree product of nodes whose indegree is not zero.

(9) A thread (thread) is a minimum unit for an operating system to perform computing scheduling. It is included in a process and is the actual operating unit of the process. The thread refers to a single sequential control flow in a process. A plurality of threads can be concurrently executed in a process, and each thread executes different tasks in parallel. In Unix System V and SunOS, the thread is also referred to as a lightweight process (lightweight processes). However, the lightweight process refers to a kernel thread (kernel thread), and a user thread (user thread) is referred to as a thread.

(10) For an iteration, each repetition of a process is referred to as one iteration, and a result of each iteration is used as an initial value of a next iteration. In this application, a subprogram (a group of instructions) that needs to be repeatedly executed in a computer-specific program is repeated once, that is, a loop in the program is repeatedly executed until a condition is satisfied, which is referred to as the iteration.

(11) For a clock cycle, a machine cycle is divided into several periods of equal time. Such a time period is referred to as a beat or clock cycle. A CPU clock cycle is also referred to as a beat or one beat.

(12) An instruction per clock (Instruction Per Clock, IPC) is a quantity of instructions executed by a CPU in each clock cycle. The IPC represents a CPU design architecture. Once the CPU is designed, an upper limit of the IPC is fixed. In a manner of determining CPU performance, CPU performance=IPC (a quantity of instructions executed by the CPU in each clock cycle)×frequency (MHz clock speed). For example, IPC performance is improved by 15%, and CPU performance is improved by 15% at the same frequency.

(13) An operation code is an instruction sequence number, and is for indicating to a CPU which instruction needs to be executed. Each instruction in an instruction system has an operation code indicating nature of the operation that the instruction should perform. Different instructions are represented by different codes of an operation code field. Each code represents an instruction, for example, transfer, operation, shift, and jump. The code is an indispensable part of the instruction.

(14) An operand (operand) is a part of a computer instruction, and specifies an amount of digital operations performed in the instruction. The operand indicates a source of data required for the operation performed by the instruction. The operand is a field of an assembly language instruction. For example, the operand field may include the operand itself, an operation address, and a method for computing the operation address.

(15) An LD (Load) is a fetch instruction, indicating a first normally open contact directly connected to a bus in each line of program. The programmable controller LD (Load) is a fetch instruction, indicating a first normally open contact directly connected to a left bus in each line of program.

(16) A directed acyclic graph (Directed Acyclic Graph, DAG) is a loop-free (acyclic) directed graph. If there is a non-directed acyclic graph, and the graph from a point A to a point B can return to the point A through a point C, for example, A→B→C→A goes around in a circle and returns to A to form a loop, the graph is cyclic (cycle).

To facilitate understanding of embodiments of the present application, a technical problem to be specifically resolved in this application is further analyzed and proposed.

In a data flow (DataFlow) program, when a target of the data flow points to an input of a previous instruction, the instruction is a data flow loop (Back Edge). Depending on the way the data flow architecture processes the loop, the data flow architecture may include static and dynamic data flow architectures.

Solution 1: Static Data Flow Architecture

The static data flow architecture (StaticDataflow Architecture) specifies that when each data flow transfers data to a previous instruction, if backflow data is blocked with a data flow that is being computed, the previous instruction backpressures current computation. Backpressure check needs to check whether a target node needs to receive a new input. FIG. 1 is an example of cyclic computation in a static data flow architecture in the conventional technology. For example, it is assumed that a graph computing task includes five instructions, which are an instruction 1: an add instruction, an instruction 2: an add instruction, an instruction 3: an 1*d* instruction, an instruction 4: an add instruction, and an instruction 5: a st instruction. In addition, it is assumed that the graph computing task includes at least four iterative computing tasks, which respectively correspond to a first-beat cycle 0, a second-beat cycle 1, a third-beat cycle 2, and a fourth-beat cycle 3 in terms of time sequence. Each time of repeated and complete execution of the foregoing five instructions is referred to as one "iterative computing task", and a part or all of execution results in each iterative computing task is used as an initial value of a next iterative computing task. For example, after the instruction 1 is executed in the cycle 0, the instruction 2 is executed. An execution result of the instruction 2 is used as not only an input of the instruction 3 in the cycle 0, but also an input of the instruction 1 in the next-beat cycle 1. An execution result of the instruction 2 in the cycle 1 is used as not only an input of the instruction 3 in the cycle 1, but also an input of the instruction 1 in the next-beat cycle 2. By analogy, an execution result of the instruction 2 in each subsequent iterative computing task is used as not only an input of the instruction 3 in the iterative computing task, but also an input of the instruction 1 in a next iterative computing task. In the foregoing static data flow architecture, during operation iteration, a backflow node is prevented from generating an initial value of a next iteration through backpressure. Similarly, a cross-iteration dependency relationship may be complied with in a manner of data backflow and backpressure. For example, in the cycle 3, when the instruction 3:ld miss is always in a blocked state, the instruction 2 may be prevented from generating an initial value of the instruction 1 in a next iterative computing task through backflow, to prevent starting execution of the next iterative computing task.

A disadvantage of solution 1 is as follows: In complex bus communication, which data flow will flow back first cannot be ensured. Therefore, when this solution is used on a complex graph, a compiler needs to add a barrier (barrier) or select (select) instruction to ensure that all nodes in the graph are correctly executed. In addition, in memory processing, the compiler needs to add too much data backflow to ensure correctness of memory read and write. In this way, for a complex graph, performance of the traditional static graph architecture can only complete inter-instruction parallelism of one iteration (or a lower part of the iteration and an upper part of a next iteration).

Solution 2: Dynamic Data Flow Architecture

Figure 2:
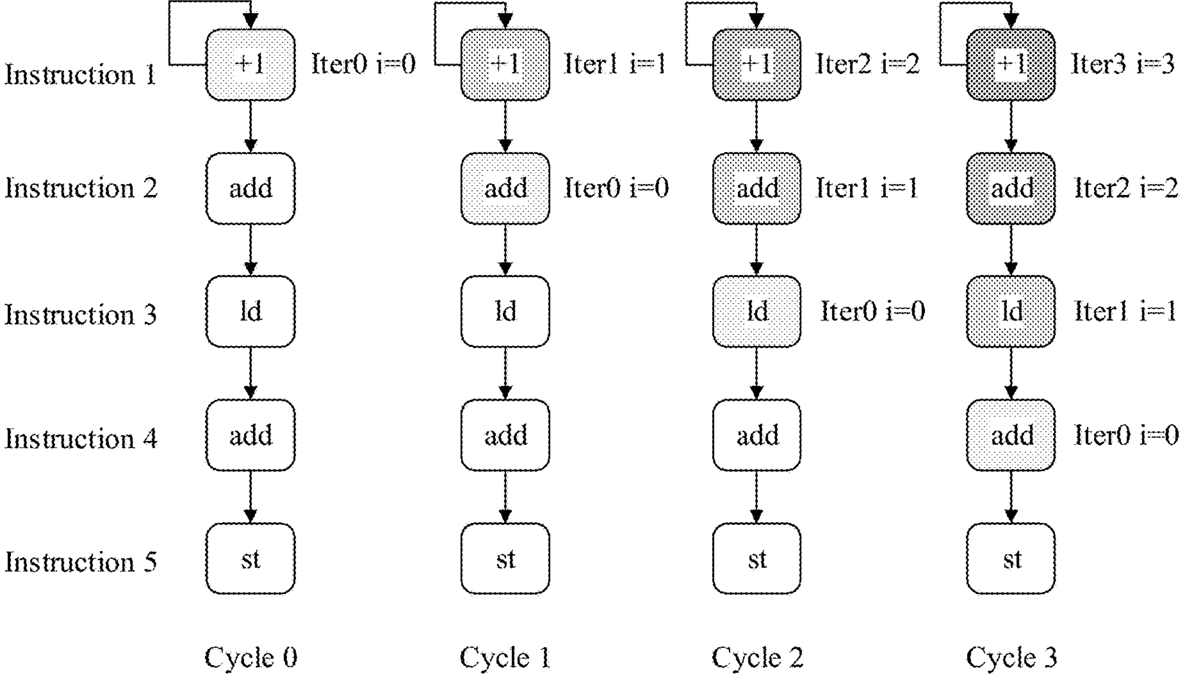
FIG. 2 is an example of cyclic computation in a dynamic data flow architecture in the conventional technology.

In contrast, the dynamic data flow architecture (Dynamic Dataflow Architecture), such as WaveScalar, allow simultaneous operations between different iterations. FIG. 2 is an example of cyclic computation in a dynamic data flow architecture in the conventional technology. In an operation process, an input of each graph is configured with a Wave Advance instruction, and a function of the Wave Advance instruction is to update an input token (that is, iter0 i=0, iter1 i=1, iter2 i=2, iter3 i=3 in FIG. 2). In this way, the dynamic data flow architecture may simultaneously perform operations on instructions of different iterative computing tasks. Specifically, in the dynamic data flow architecture, tokens (token) are added to data flows and inputs of different iterative computing tasks, and an operation can be performed only after the input tokens (for example, the iter0, the iter1, the iter2, and the iter3) are corresponding, that is, data in different iterative computing tasks is distinguished by using the carried tokens. For example, if data includes the iter0, it is considered that the data is corresponding data in a first iterative computing task of a graph computing task; if data includes the iter2, it is considered that the data is a third iterative computing task of the graph computing task; and so on. Because data of different tokens shares a set of status buffers, and an iterative computing task with a small token backpressures an iterative computing task with a large token, iterations of different tokens cannot be executed in parallel. That is, in the dynamic data flow architecture, a quantity of iterations that can be simultaneously performed on a graph is still determined through backpressure.

Disadvantages of solution 2 are as follows: Too many Wave Advance instructions occupy a large amount of instruction space; cross-iteration parallelism is limited by storage (a plurality of iterations share a set of operand buffers (operand buffer)), and write after write (Write after Write) parallelism is not greatly improved; instructions of a current iteration cannot be effectively distinguished and preferentially executed; and storage dependencies between iterations cannot be effectively processed.

Therefore, technical problems to be resolved by this application may include the following:

1. Further improve parallelism in cyclic computation of data flows. 2. Reduce instruction space occupied by instructions. 3. Further improve overall efficiency of cyclic iterative computation.

To further understand embodiments of the present application, the following specifically describes concepts such as a data flow architecture, a processing engine (PE), a graph computing task, an iterative computing task, status data, and a graph computing instruction in this application. In the data flow architecture in this application, a dependency relationship between instructions is explicitly (Explicit) described at an instruction set layer, and parallelism between instructions is directly presented to hardware for execution. A theoretical computing model of the data flow architecture may be abstracted into a directed graph including P nodes. A connection between nodes (node) represents a data flow (Dataflow) or a control flow (ControlFlow). Each node is used as a graph instruction (also referred to as a graph computing instruction in this application). Once an input of each node is ready (Ready), a current node may perform an operation and transfer a result to an input of a corresponding node. Therefore, in a same graph, nodes that are not on a same path can be executed in parallel to improve processing parallelism. It should be noted that the data flow architecture in this application further needs to support a control flow. Therefore, in this application, (a data flow plus a control flow) is first collectively referred to as a directed graph computing flow architecture, and is briefly referred to as a graph computing flow architecture or a graph computing architecture (Graphflow Architecture). It should be further noted that a control flow in the graph computing architecture in this application is not equivalent to a control flow of a general processor. The control flow in the general processor architecture is mainly an execution instruction for a general operation, and the control flow in the graph computing architecture in this application is mainly various graph computing control instructions (such as a switch/gate/predicate/gate instruction) in a graph.

In this application, a theoretical computing model of the graphflow architecture may be abstracted into P nodes (node). Each node may include an instruction, perform an operation, and transfer a result to the node or another node. Therefore, this application further defines a basic format of a flow instruction (also referred to as a graph computing instruction) in the graph computing instruction set (Graphflow Instruction-Set Architecture, Graphflow ISA). That is, an operation method of the P graph computing instructions included in the graph computing task in this application, and connection and sequence information between the P graph computing instructions are defined. A format of a graph computing instruction corresponding to a single node may be represented as [ID+opcode+destOID+dest1ID].

Figure 3A:
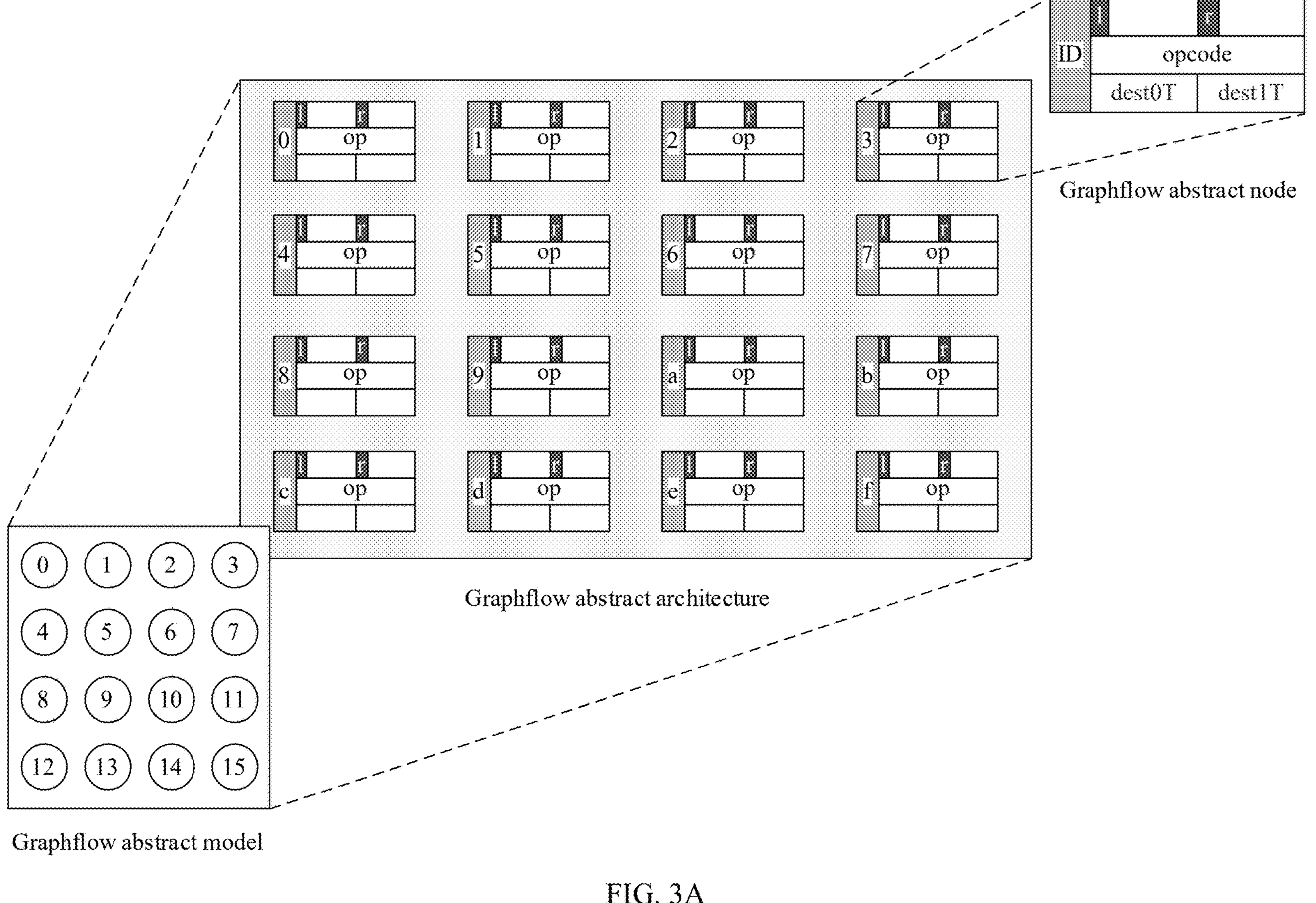
FIG. 3A is an abstract model of a graph computing instruction according to an embodiment of the present application.

FIG. 3A is an abstract model of a graph computing instruction according to an embodiment of the present application. An ID-based graph computing instruction is placed on a node whose sequence number is a corresponding ID. A value range of the ID is [0, P−1], and P indicates a total quantity of nodes in a graphflow. A graph computing instruction can express one or two dependencies, indicating that result data is transferred to a destOID and a dest1ID. As shown in FIG. 3A, each abstract node can include one instruction and a maximum of two outputs. Each abstract node has its own left input (l), right input (r), condition input (p) buffer, operation code (operation code, opcode), and two target pointers (a destOT and a dest1T, where T represents a left/right input of a target instruction). It is assumed that P nodes are fully connected. Therefore, a value range of the dest is [0, P−1], indicating that an output of any node can point to a left input (l) or right input (r) buffer of any node. Fields (an opcode, a dest0T, a dest1T) in the abstract node can be written in a graph construction phase, but are fastened as read-only in an execution phase. Once in the execution phase, all nodes need to check in parallel whether left and right inputs of the nodes are arrived. If both inputs are ready (ready), an operation can be performed and a result can be transferred to left and right outputs of a next node. A node where an input does not arrive is in an idle (Idle) state.

Figure 3B:
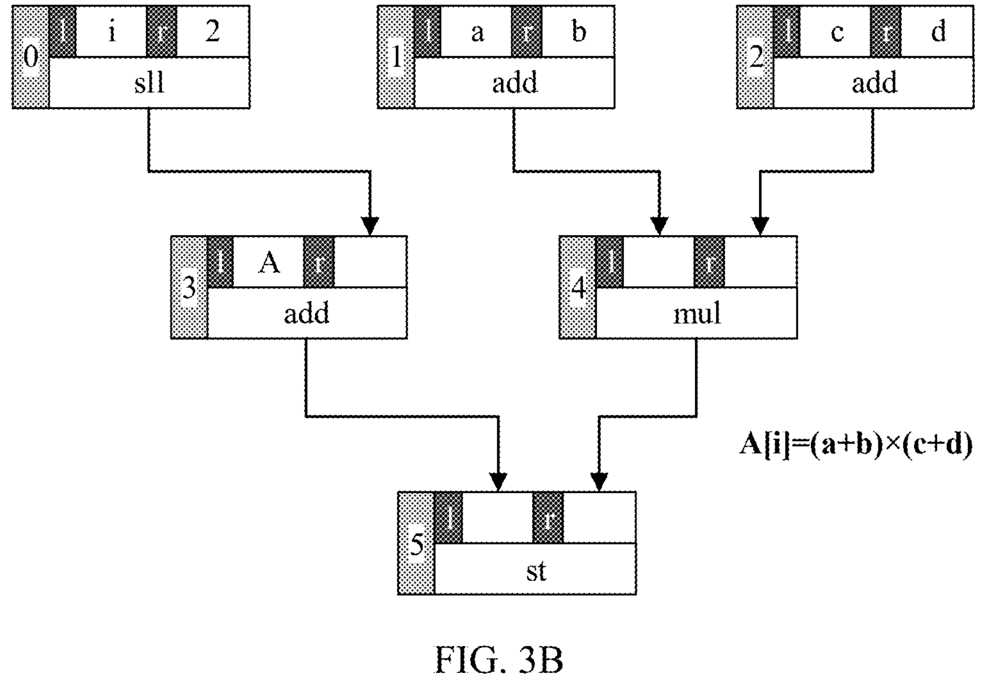
FIG. 3B is a schematic diagram of a graph computing instruction according to an embodiment of the present application.

For example, FIG. 3B is a schematic diagram of a graph computing instruction according to an embodiment of the present application. It is assumed that inputs required by each graph computing instruction are a left input (l), a right input (r), and a condition input (p). Once the input required by the instruction is ready, an operation can be performed, and an operation result is transferred to an input of a subsequent corresponding node. For example, after an add operation a+b in an instruction 1 ends, the operation may be transferred to a left input (l) of an instruction 4. A dependency relationship between the foregoing instructions may be represented as "1add 4l" in a graph architecture instruction set in this application. This means that for the instruction 1, once its input is ready, the result is transferred to the left input of the instruction 4. In the graph computing instruction set in this application, only an output address needs to be provided, and input information of an instruction does not need to be provided. For the input, only one or more instructions need to be transferred into an input of each instruction. As can be seen from FIG. 3B, parallelism between instructions is obvious. Instructions that do not have dependency relationships can run concurrently. For example, instructions 0, 1, and 2 are used for a beat, and instructions 3 and 4 are used for a beat. In hardware implementation of the graph computing architecture in this application, checking of a dependency relationship can be completed when a ready field and a valid field that are input to each node are checked. The graph computing task in this application does not require a large quantity of hardware to check a dependency relationship between registers.

Figure 3C:
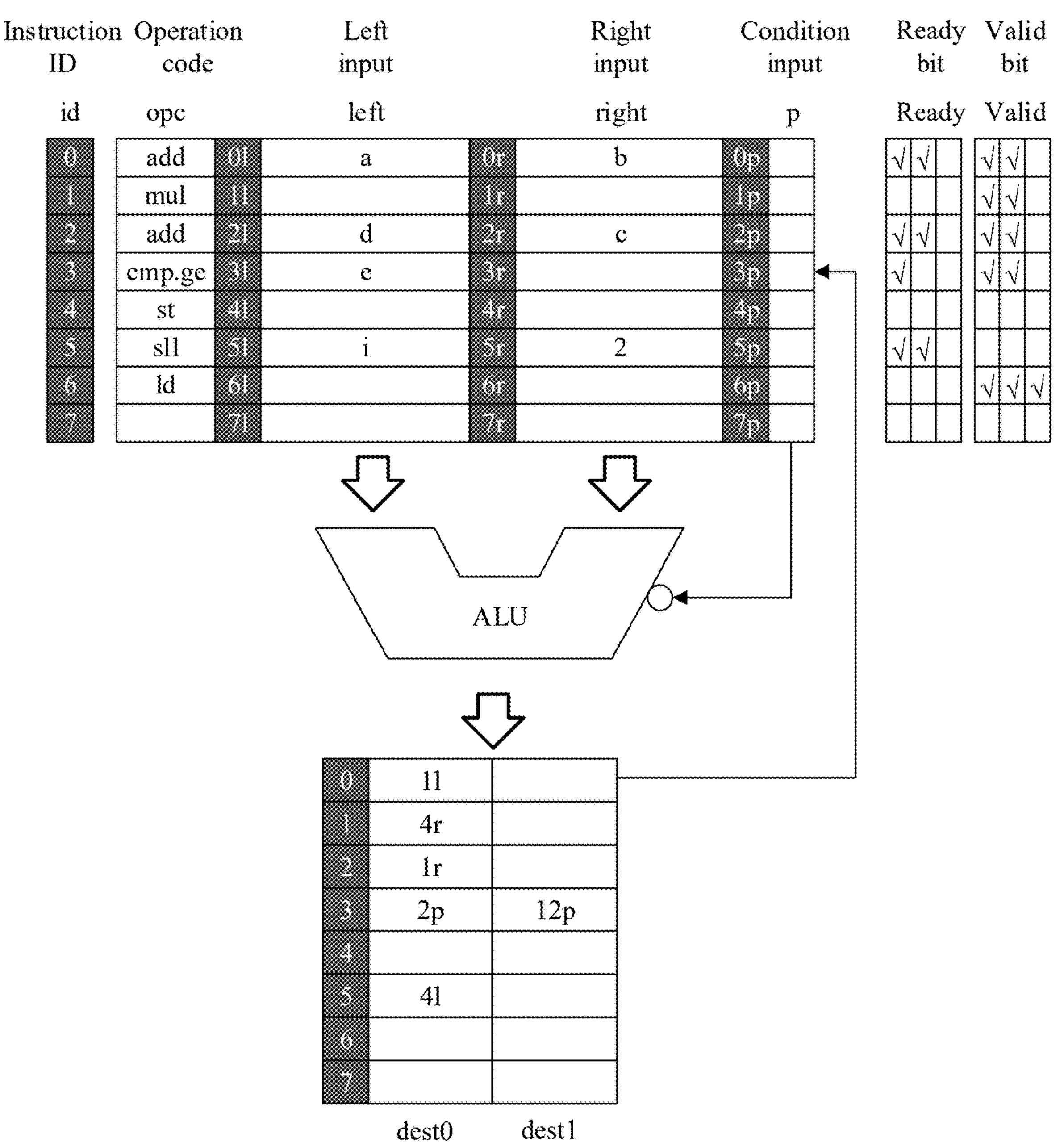
FIG. 3C is a schematic diagram of a model of a graph computing task including a plurality of graph computing instructions according to an embodiment of the present application.

FIG. 3C is a schematic diagram of a model of a graph computing task including a plurality of graph computing instructions according to an embodiment of the present application. FIG. 3C shows a simplified hardware model of a graph computing task in a PE. In this model, eight graph computing instructions whose instruction IDs are 0, 1, 2, 3, 4, 5, 6, and 7 are included. In each beat, each graph computing instruction detects its own valid bit (valid) and a ready bit (ready) of whether an operand (operand) being ready. Then, an arbitration logic in the PE sends one of ready instructions to an arithmetic and logic unit (Arithmetic and Logic Unit, ALU) for operation, and a sent operand sets a ready bit of the sent instruction to be unready (ready bit unset). After the instruction operation is completed, an operation result is written back to an input of a corresponding instruction, and a ready bit (ready bit) of a corresponding destination address (destination) is set. In this application, the PE may be configured based on different dominant frequency requirements and time sequence requirements. A PE 101 may allow X input instructions to be selected within one beat for sending and parallel operation is performed on X ALUs. X is an integer greater than or equal to 1.

Based on the foregoing description, the following provides descriptions with reference to the graph computing apparatus and the related device provided in embodiments of the present application.

The graph computing apparatus or a processor including the graph computing apparatus in this application is designed based on the foregoing graph computing architecture (Dataflow Architecture). The graph computing apparatus may be a dedicated processor used for graph computing, or may be a functional unit used for graph computing in a general-purpose processor. The graph computing apparatus or the processor including the graph computing apparatus may be located in any electronic device, such as a PC, a computer, a mobile phone, or a tablet. The graph computing apparatus or the processor including the graph computing apparatus may be specifically a chip or a chipset or a circuit board carrying a chip or a chipset. The chip or the chipset or the circuit board carrying a chip or a chipset may work under necessary software driving. The following shows several implementations of the graph computing apparatus in the processor in this application by using examples.

Figure 4A:
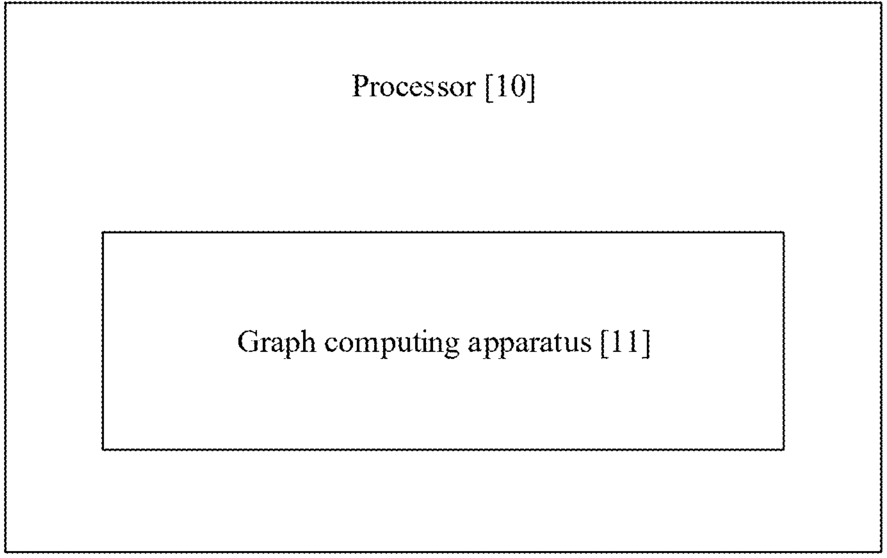
FIG. 4A is a schematic diagram of a structure of a processor according to an embodiment of the present application.

FIG. 4A is a schematic diagram of a structure of a processor according to an embodiment of the present application. The processor 10 may execute a graph computing task. The processor 10 may include only a graph computing apparatus 11. Optionally, the processor 10 may further include another functional module other than the graph computing apparatus 11.

Figure 4B:
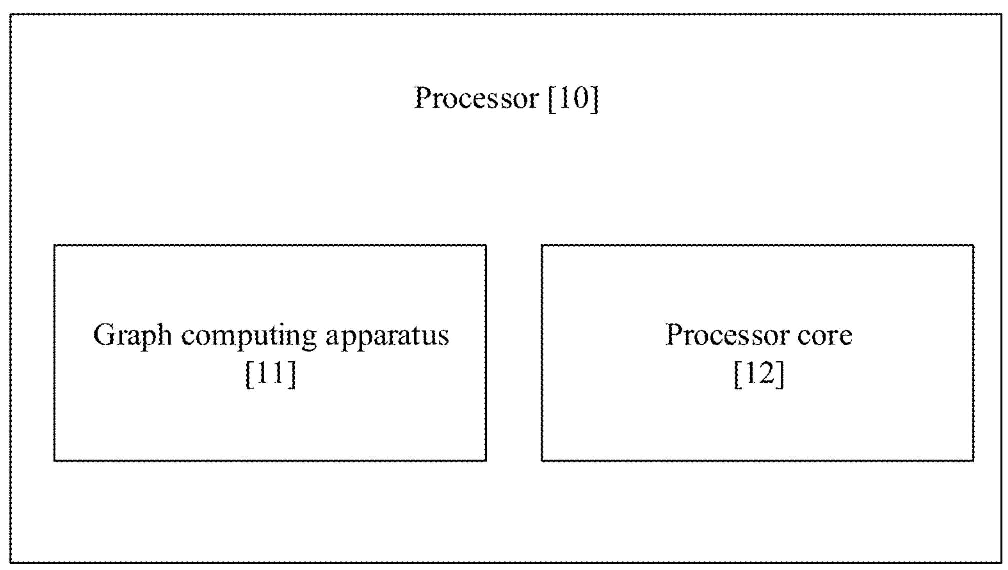
FIG. 4B is a schematic diagram of a structure of another processor according to an embodiment of the present application.

FIG. 4B is a schematic diagram of a structure of another processor according to an embodiment of the present application. The processor 10 may be a multi-core processor. The processor 10 may include at least one processor core 12 (for example, a general-purpose processor core) and at least one graph computing apparatus 11. The processor core 12 may be configured to execute a general-purpose computing task, and the graph computing apparatus 11 may implement a function of executing a graph computing task. Optionally, the processor core 12 and the graph computing apparatus 11 may be coupled and communicate with each other through a bus or in another manner, to together complete a computing task of the processor 10.

Figure 4C:
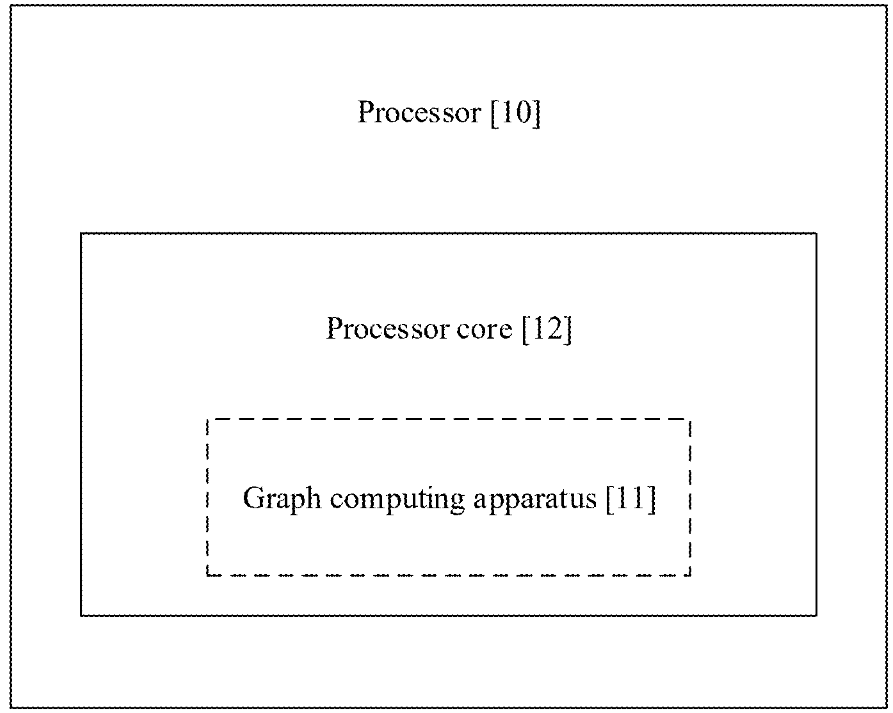
FIG. 4C is a schematic diagram of a structure of still another processor according to an embodiment of the present application.

FIG. 4C is a schematic diagram of a structure of still another processor according to an embodiment of the present application. The processor 10 may be a superscalar processor. The processor 10 may include at least one processor core 12 (for example, a general-purpose processor core). A graph computing apparatus 11 may be used as a function execution unit (Function Unit) in the processor core 12 to independently execute a graph computing task in a pipeline execution phase of the processor 10, or concurrently execute a graph computing task with another general-purpose operation unit. In this way, a function of executing a graph computing task is implemented in a same processor. To be specific, a graph computing apparatus 102 may be integrated into the processor core 12 of the processor 10, and run in the pipeline execution phase as one of a plurality of execution units in the processor core 12.

It should be noted that functional modules in the processor in FIG. 4A to FIG. 4C may communicate with each other through a bus or in another connection manner, and a connection relationship shown in the figure does not constitute a limitation on a connection relationship between the functional modules. Functional modules are further described in subsequent embodiments, and details are not described herein again. It should be further noted that, in this application, essence of the graph computing task may be a task of converting general operation code into a graph for operation.

It may be understood that a structure of the processor in FIG. 4A to FIG. 4C is merely some example implementations provided in embodiments of the present application, and the structure of the processor in embodiments of the present application includes but is not limited to the foregoing implementations.

Figure 4D:
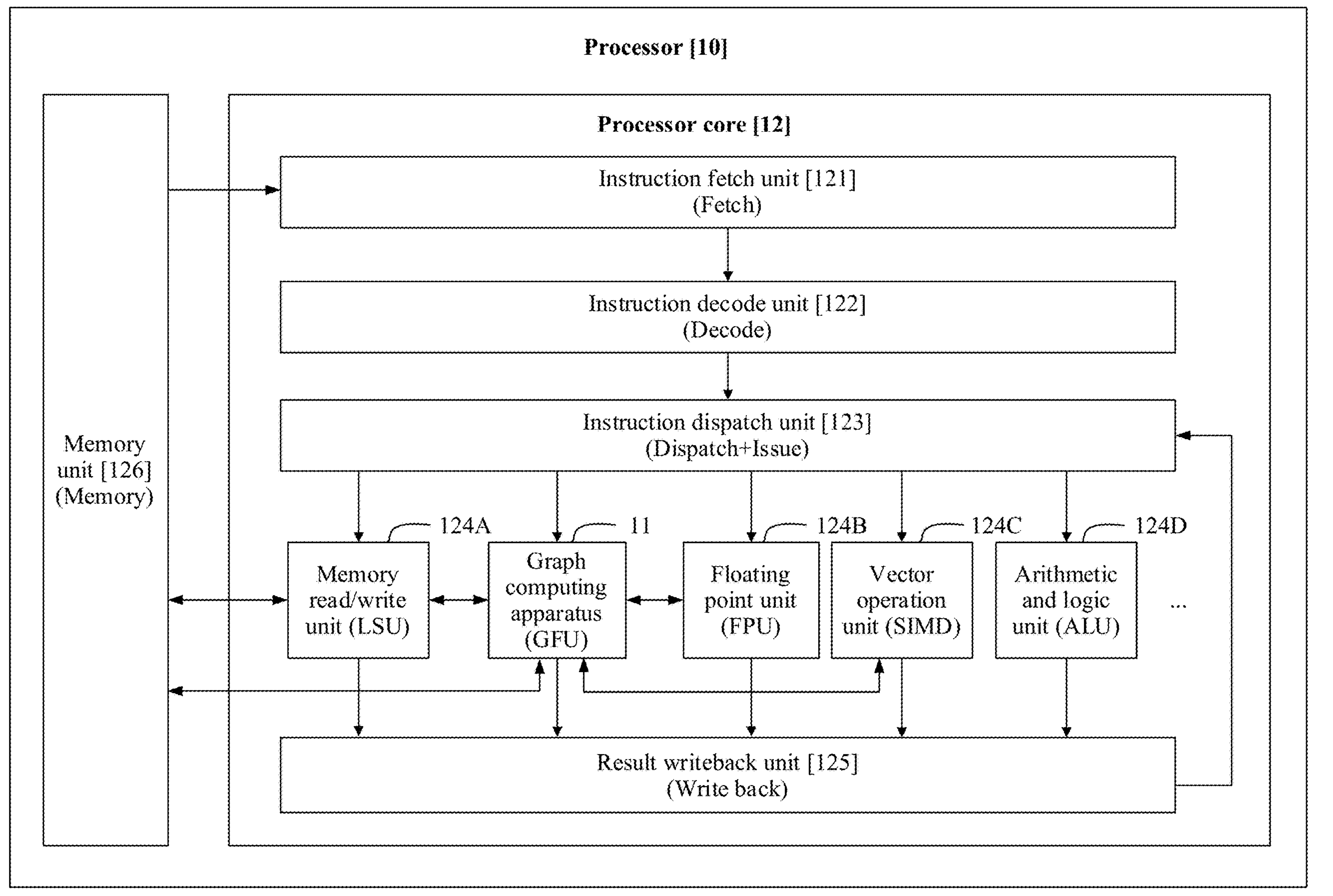
FIG. 4D is a schematic diagram of a structure of still another processor according to an embodiment of the present application.

Based on the foregoing description, FIG. 4D is schematic diagram of a structure of still another processor according to an embodiment of the present application. The processor 10 may be a superscalar processor. This application provides a more specific structure of the processor based on the architecture of the processor in FIG. 4C. The following describes a process from compilation to execution of a target program with reference to a structure and a function of the processor 10 in FIG. 4D.

1. Program source code written in high-level languages is provided, for example, source code written by developers in various programming languages (such as C language and JAVA).

2. Based on a cost estimation model, which part of code in the source program is suitable for general operation mode compilation and which part of code is suitable for graph computing flow mode compilation are determined, to compile the code into a general operation object file or a graph computing flow object file (both are binary) in different compilation modes. For example, an application (Application, APP) may have millions of instructions, and a plurality of instructions actually have an input and output relationship. For example, if an input condition for executing an instruction is an output result of another instruction, basic elements (a vertex and an edge) in graph computing may be formed between the two instructions. Therefore, in the source program compilation phase, based on the cost estimation model, a complex instruction sequence (for example, an instruction sequence with a complex association relationship, indirect jump, or many interrupts) or an instruction sequence that is used only once may be compiled in a general operation mode. An instruction sequence suitable for repeated repetition, for example, a loop or a function that is repeatedly invoked (an association relationship of the cycle or the function may be complex or simple, but usually needs to be repeatedly executed) is compiled in a graph computing flow mode. Compilation in the graph computing flow mode refers to abstracting logic used between code into a graph computing architecture, and generating binary machine instructions in the graph computing architecture in a program compilation phase (that is, compiled by a compiler in the graph computing flow mode) by using all operations that are originally performed by a processor, such as check, jump, and prediction. Instructions in the graph computing architecture include a relationship between input and output of the instructions. Therefore, when a graph computing apparatus 11 (which may also be referred to as a graph computing flow unit (Graphflow Unit, GFU) in FIG. 4D) in the processor performs an actual operation, logical determining between instructions can be greatly reduced, overheads in a CPU core are greatly reduced, performance is good, and power consumption is low.

3. A linker (link) is used to link a compiled general operation object file and a compiled graph computing flow object file into a synthesis program (an executable file). For example, the object file is a .o file, and when the program needs to be executed, a link is further required. In a linking process, the foregoing object file (for example, the .o file) is mainly linked to a library to create an executable file. It may be understood that compilation phases corresponding to 1, 2, and 3 may be completed on a device (such as a server or a compiler) other than a device in which the processor 10 is located, may be precompiled in advance on a device in which the processor 10 is located, or may be compiled, while executing, on a device in which the processor 10 is located. This is not specifically limited herein.

4. After the executable file is executed on the processor 10, the processor 10 loads a to-be-executed target program (for example, including a code segment, a data segment, a BSS segment, or a stack) in the executable file to a memory unit 126 by performing a series of operations such as instruction loading, instruction prefetching, instruction predecoding, and branch prediction.

5. An instruction fetch unit 121 may obtain the target program from the memory unit 126 in a manner of continuously obtaining one instruction each time for a plurality of times, and further each instruction enters an instruction decode unit 122 from the instruction fetch unit 121 for decoding.

6. The instruction decode unit 122 splits and interprets the to-be-executed instruction based on a predetermined instruction format, to further obtain a micro-operation instruction, that is, the decoded to-be-executed instruction in this application, and sends the micro-operation instruction to an instruction dispatch unit 123.

7. After receiving the decoded to-be-executed instruction, the instruction dispatch unit 123 distributes, based on a type of each instruction, the to-be-executed instruction to each execution unit (Execution Unit) for computation, for example, dispatches the to-be-executed instruction to a general operation unit 124 or the graph computing apparatus 11 for operation. Because the graph computing apparatus 11 is disposed in a processor core 12 of the processor 10, the instruction dispatch unit 123 may be directly connected to and communicate with the graph computing apparatus 11, to directly dispatch an identified graph computing control instruction to the graph computing apparatus 11, without using another message channel or memory read/write manner for communication. This greatly reduces a communication delay. In a possible implementation, the general computing instruction and the graph computing control instruction in this application may be identified by using different flag bits (the flag bits may be added in the foregoing compilation phase). That is, different types of instructions may correspond to different instruction IDs, so that the instruction dispatch unit 123 may perform identification based on the instruction IDs.

8. The graph computing apparatus 11 receives and executes a graph computing control instruction, and further executes a graph computing task, to obtain an execution result of the graph computing task. One or more general operation units 124 receive and execute a general computing instruction, to obtain an execution result of the general computing task. Optionally, the graph computing apparatus 11 and the general operation unit 124 may execute instructions in parallel or may execute instructions in serial, depending on a logical relationship between instructions executed by these execution units in the target program. This is not specifically limited in this embodiment of the present application.

9. Finally, both the graph computing apparatus 11 and the general operation unit 124 may send a computation result to a result writeback unit 125, and the result writeback unit 125 may feed back a part or all of the computation result to the instruction dispatch unit 123. For example, the part or all of the computation result is used as a parameter in an instruction dispatched by a subsequent instruction dispatch unit 123. Optionally, a first execution result or a second execution result may also be directly written into the memory unit 126, or written into the memory unit 126 by using a memory read/write unit 1013A, so that a related execution unit (for example, the computing apparatus 11 or the memory read/write unit 1013A shown in the figure) may obtain a required parameter from a corresponding storage location. Because the graph computing apparatus 11 is disposed in the processor core 12 of the processor 10, the processor core 12 has permission and conditions to obtain related computing statuses of the graph computing apparatus 11 and an another general-purpose operation unit 1013, to control synchronous or asynchronous running between the graph computing apparatus 11 and the another operation unit. This improves running efficiency of the processor.

In conclusion, the graph computing apparatus 11 receives, like the another general-purpose operation units, graph livein (liveIn) data in a register sent from the instruction dispatch unit 123 (for example, including an instruction sending and reservation station), and transfers the input to a corresponding computing node of the graph computing apparatus 11. Similarly, the graph computing apparatus 11 also writes back graph liveout (liveOut) output data to the result writeback unit 125 (for example, including a register and a reorder buffer (Reorder Buffer)), to write an output of the graph to a corresponding register and an instruction reservation station that depend on the output of the graph.

In the foregoing processor structure in FIG. 4D, a data flow architecture is combined into a processor of a control flow architecture, to optimize the data flow on a hotspot cyclic iteration instruction, a hotspot instruction sequence, and a repeatedly executed instruction sequence in a general operation. A quantity of instruction fetching times and dependency check of hotspot instructions and power consumption are significantly reduced. The data flow architecture also effectively increases a width of a CPU instruction window and improves CPU performance.

Figure 5A:
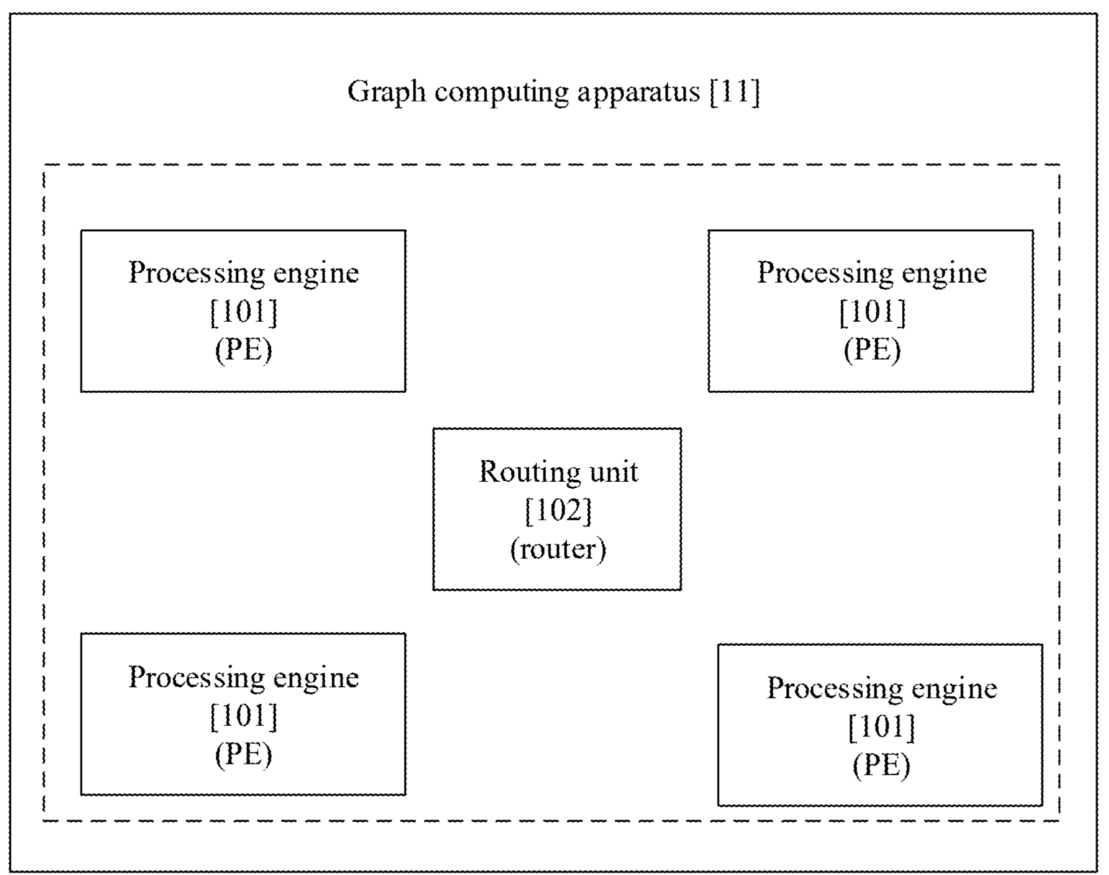
FIG. 5A is a schematic diagram of a structure of a graph computing apparatus according to an embodiment of the present application.

Based on the foregoing description, this application provides a graph computing apparatus. FIG. 5A is a schematic diagram of a structure of a graph computing apparatus according to an embodiment of the present application. The graph computing apparatus 10 includes at least one processing engine 101 (PE). In FIG. 5A, an example in which a quantity of PEs is four is used. Optionally, the graph computing apparatus 10 may further include a routing unit 103 coupled to the at least one processing engine PE.

Each processing engine 101 is configured to execute a graph computing task. All iterative computing tasks of the graph computing task are included. A plurality of processing engines 101 may concurrently execute a plurality of graph computing tasks in this application. The graph computing task in this application may be considered as the directed graph including N nodes, and each node is used as a graph computing instruction.

The routing unit 103 is configured to: when there is a dependency relationship between instructions of different graph computing tasks separately executed by the plurality of processing engines 101, perform corresponding forwarding by using the routing unit 102 (router), and perform cooperative computing between different processing engines.

FIG. 5A shows a simplified hardware model of combining C (for example, C=4) PEs into a cluster (Cluster). PEs in a cluster can run concurrently. Therefore, C×X instructions can be run in a beat. When a destination of an internal instruction of the PE points to an input of an instruction of another PE, for example, an instruction 4 points to an instruction 12, communication needs to be performed by using an output unit of the current PE by using a crossbar. If crossbars of a cluster are not congested, a PE in a cluster can be written into an operand buffer of another PE within a beat.

It can be seen from FIG. 5A that, different PEs of a cluster may execute, in each beat, an instruction that has no dependency relationship with C×X. Under ideal dispatching, the hardware in the preceding figure can reach peak IPC-C×X of performance of a superscalar processor. It may be understood that, due to a limitation on communication, data transmission across PEs requires a separate delay. To hide the delay of the additional beat, compiler dispatching can compute graph computing instructions that are used for communication between different PEs as early as possible.

Figure 5B:
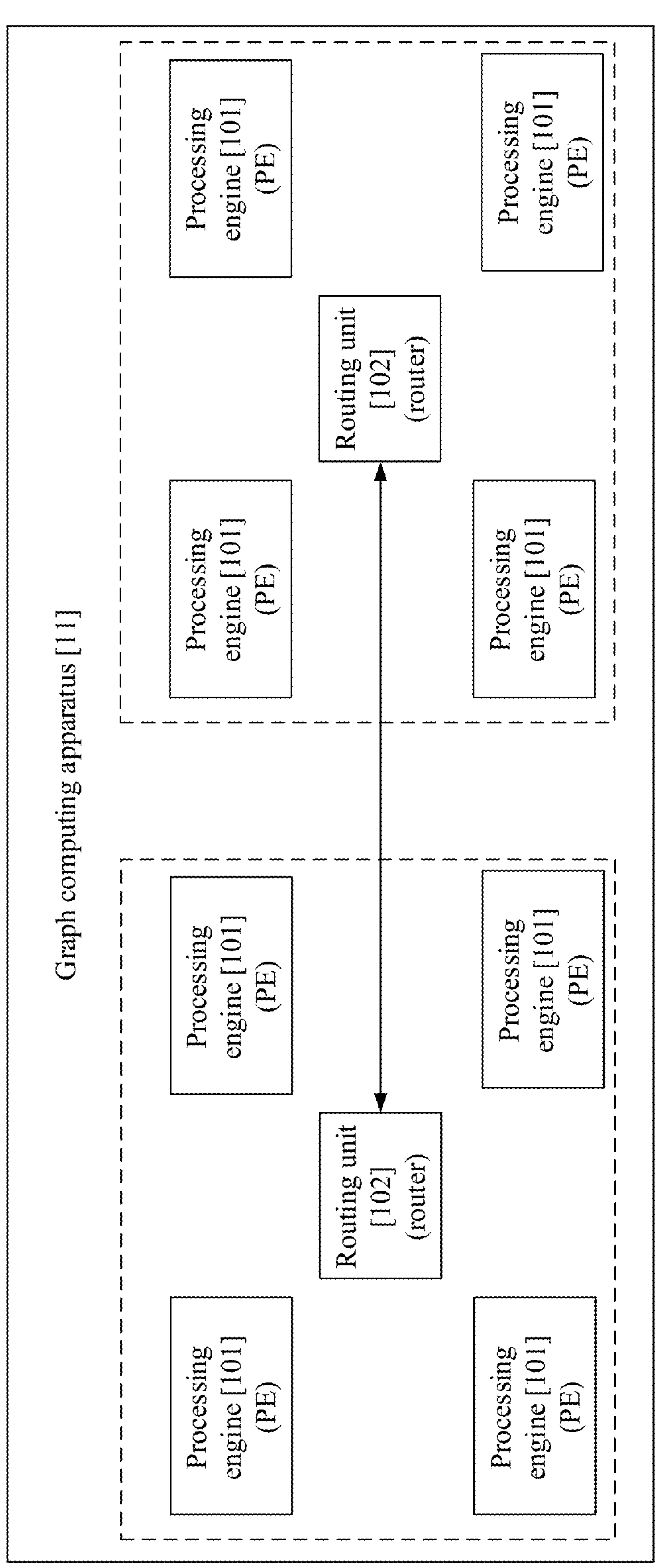
FIG. 5B is a schematic diagram of a structure of another graph computing apparatus according to an embodiment of the present application.

FIG. 5B is a schematic diagram of a structure of another graph computing apparatus according to an embodiment of the present application. In the graph computing apparatus (a graph architecture), parallelism may be further improved by extending a quantity of clusters. The clusters communicate with each other through routers. According to the bus design, a communication delay and complexity between clusters increase with the quantity R of clusters. Therefore, for dispatching, a compiler can run subgraphs that do not have dependency relationships in different clusters, to prevent a critical path from running across clusters and avoid movement of a large amount of data.

If a graph includes P nodes, ideal hardware for executing the graph is that each node has an operation unit and a result can be transferred to an operation unit of a next level in a next beat through an ideal N-to-N crossbar. However, when P is large, the N-N crossbar is difficult to implement. Therefore, in an actual hardware design, this application defines that P instructions share X operation units/PEs (Process Engine). This is equivalent to selecting a maximum of X instructions (a ready instruction need to be input) from P instructions in each beat of a PE for simultaneous computation.

It should be noted that in the graph computing apparatuses provided in FIG. 5A and FIG. 5B, structures of PEs may be the same or may be different. At least one PE is a structure and a function of a PE provided in this application. A structure and a function of another PE are not specifically limited in this application.

It may be understood that structures of the graph computing apparatuses in FIG. 5A to FIG. 5B are merely some example implementations provided in embodiments of the present application. The structures of the graph computing apparatuses in embodiments of the present application include but are not limited to the foregoing implementations.

Figure 6A:
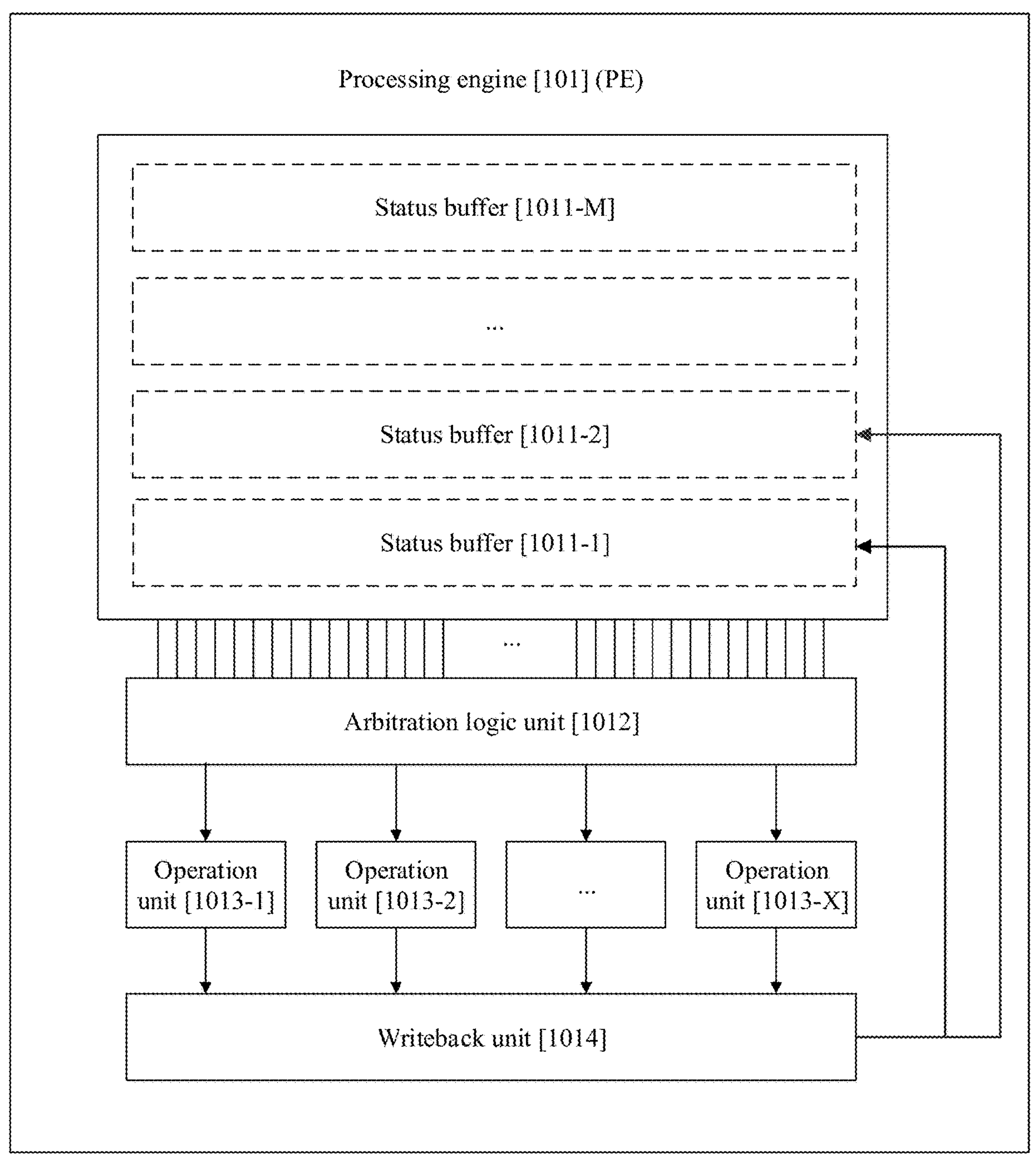
FIG. 6A is a schematic diagram of a structure of a processing engine according to an embodiment of the present application.

Based on the foregoing description, this application provides a graph computing apparatus. FIG. 6A is a schematic diagram of a structure of a processing engine according to an embodiment of the present application. The processing engine 101 is a specific structure of at least one processing engine PE in any one of the foregoing graph computing apparatuses. A graph computing apparatus 11 includes at least one processing engine 101 (Process Engine, PE). Each of the at least one PE 101 includes M status buffers 1011 (which respectively are 1011-1, 1011-2, . . . , and 1011-M), an arbitration logic unit 1012, and X operation units (which respectively are 1013-1, 1013-2, . . . , and 1013-X). M is an integer greater than 1, and X is an integer greater than or equal to 1. It should be noted that, in subsequent embodiments, one of the at least one processing engine 101 is mainly used for description, and details are not described in the following.

Each of the M status buffers (operand buffer) 1011 is configured to store status data of one iterative computing task. The one iterative computing task is one of N iterative computing tasks included in a graph computing task. Nis an integer greater than 1. Specifically, each status buffer 1011 is a storage region, and may include a dedicated hardware register, or may use a memory as a buffer. That is, the M status buffers may be logically divided or may be divided by hardware. This is not specifically limited in this embodiment of the present application. The graph computing task is a graph computing program including N iterative computing tasks. It is assumed that the graph computing task includes P graph computing instructions, the graph computing task needs to be executed N times for the P graph computing instructions, and each iterative computing task needs to be computed based on a related computation result of a previous iterative computing task. Status data of one iterative computing task includes all input data for executing the iterative computing task, for example, including a left input, a right input, and a condition input of each graph computing instruction. For example, the status buffer 1011-1 is configured to store status data of a first iterative computing task of the graph computing task, the status buffer 1011-2 is configured to store status data of a second iterative computing task of the graph computing task, the status buffer 1011-3 is configured to store status data of a third iterative computing task of the graph computing task, and so on.

That is, in this application, status data of a plurality of iterative computing tasks of the graph computing task is separately stored in different status buffers, so that operation statuses of the plurality of iterative computing tasks may be independent of each other and do not interfere with each other. Therefore, instructions in different iterative computing tasks may run in parallel when input data (for example, the left input, the right input, or the condition input) is ready (ready). For example, if an instruction in an iterative computing task is blocked, blocking interference is not caused to a related instruction in another iterative computing task. Therefore, a technical defect in the conventional technology that iterations of different tokens cannot be executed in parallel because data of a plurality of iterative computing tasks is distinguished only by using an iterative token, and an iterative computing task with a small token may back-pressure an iterative computing task with a large token is avoided.

The arbitration logic unit 1012 is configured to: determine, based on status data in the M status buffers, L graph computing instructions to be executed in a current clock cycle, and allocate the L graph computing instructions to the X operation units. The L graph computing instructions are instructions respectively corresponding to T iterative computing tasks. The N iterative computing tasks include the T iterative computing tasks. Both L and T are integers greater than or equal to 1 and less than or equal to X. Specifically, it is assumed that the graph computing task includes the P graph computing instructions. When the graph computing task in this application is executed, the M status buffers 1011 may store a maximum of P×M graph computing instructions. Therefore, a plurality of graph computing instructions may be ready (ready), that is, input data of these graph computing instructions arrives. In this case, the arbitration logic unit 1012 determines, based on a signal of a direct connection line of a chip circuit between the M status buffers 1011, that input data of which graph computing instructions in the current P×M graph computing instructions is ready, to select, from the ready graph computing instructions, the L graph computing instructions to be executed in a next clock cycle. The L graph computing instructions are instructions in the T iterative computing tasks. In other words, a plurality of graph computing instructions may be selected in one iterative task, or one graph computing instruction may be selected in one iterative task. That is, for the N iterative computing tasks of the graph computing task, the L instructions of the current specific execution condition are selected from the N iterative computing tasks, and are allocated to the operation units 1013 in the graph computing apparatus 11 for operation, so that parallelism between the iterative computing tasks can be increased, to improve execution efficiency of the graph computing task as much as possible. A value of L may be an integer greater than or equal to 1 and less than or equal to X, that is, a maximum value of X may be obtained, and parallelism is X. If instructions in different currently ready iterative computing tasks are insufficient, the value of L may be less than X, that is, the operation unit may be idle in one or some clock cycles.

The arbitration logic unit 1012 may perform determining based on a direct connection line of a chip circuit between the M status buffers. For example, each region that is in each status buffer 1011 and that is used for storing status data of a graph computing instruction may report, to the arbitration logic unit 1012 in real time by using a connection line, whether current input data arrives. For example, there are a total of P×M (it is assumed that P=8, M=4)-32 lines, and signals sent by the M status buffers to the arbitration logic unit may be signals such as 00101010001010110010101010101000. 1 represents that the current input data is ready, and 0 represents that the current input data is not ready. In this way, when input data of any graph computing instruction in the P×M graph computing instructions is ready, the arbitration logic unit 1012 may immediately learn of the ready input data, and select, based on this, the L graph computing instructions in a next clock cycle.

In a possible implementation, the graph computing task includes the P graph computing instructions. The status data of the one iterative computing task includes input data of the P graph computing instructions in a corresponding iterative computing task. The arbitration logic unit is specifically configured to: monitor whether the input data that is of the P graph computing instructions in the corresponding iterative computing task and that is in the M status buffers is ready; select, from graph computing instructions whose current input data is ready, L graph computing instructions corresponding to the earliest T iterative computing tasks in the corresponding iterative computing task, where one or more graph computing instructions are selected from one iterative computing task; and allocate, from the instruction buffer, the L graph computing instructions to L operation units in the X operation units, where one operation unit corresponds to one graph computing instruction. Specifically, the arbitration logic unit monitors status data currently stored in the M status buffers. When input data of a part of graph computing instructions in each status buffer is ready, the arbitration logic unit may select, from the part of graph computing instructions, the L graph computing instructions whose input data is ready, and send the L graph computing instructions to the operation unit for execution in the current clock cycle. According to a selection rule, ready graph computing instructions in L earlier-iterated iterative computing tasks are preferentially selected, to ensure overall execution efficiency of the graph computing task. It should be noted that T and L may be equal or may not be equal, that is, one graph computing instruction may be selected in one iterative computing task, or a plurality of graph computing instructions may be selected. That is, in each clock cycle, a maximum of X graph computing instructions may be selected from M iterative computing tasks corresponding to the M status buffers, and are separately allocated to the X operation units for computation, that is, one operation unit corresponds to one graph computing instruction in one clock cycle. Certainly, it may be understood that, when a quantity of graph computing instructions whose current input data is ready is insufficient (that is, less than X), graph computing instructions of iterative computing tasks whose quantity of iterations is less than X may be selected and allocated to T operation units. In this case, an operation unit is in an idle state.

Each of the X operation units 1013 is configured to execute the graph computing instruction allocated by the arbitration logic unit 1012. Each operation unit 1013 is responsible for executing the graph computing instruction allocated by the arbitration logic unit 1012, to achieve a technical feature of parallel computing tasks among a plurality of iterative computing tasks. Optionally, because different operation units 1013 may execute graph computing instructions in different iterative computing tasks, parallelism of executing an iterative computing task when the graph computing task is executed can be ensured. Further, optionally, the X operation units 1013 are operation units that perform a same operation function, that is, the X operation units 1013 have a same function. Therefore, when any graph computing instruction in the graph computing task is executed, the graph computing instruction may be randomly allocated to any operation unit. It may be understood that, in some cases, because a quantity of ready graph computing instructions is less than X, some operation units 1013 may not receive, in one or more clock cycles, the graph computing instructions allocated by the arbitration logic unit.

In a possible implementation, the processing engine 101 further includes a writeback unit 1014. The X operation units 1013 are separately connected to the writeback unit. Each of the X operation units is further configured to send, to the writeback unit 1014, a computation result obtained by executing the graph computing instruction. Specifically, any processing engine 101 in the graph computing apparatus 10 further includes a writeback unit 1014. The writeback unit 1014 is separately connected to X operation units 1013 in the processor engine 101. Each of the X operation units 1013 executes the graph computing instruction and obtains a corresponding computation result, and sends the computation result to the writeback unit 1014. In this way, the writeback unit 1014 writes the computation result back to a corresponding location in a corresponding status buffer 1011 based on a result address corresponding to the computation result. Therefore, a data dependency relationship between instructions in an iterative computing task of the graph computing task and a data dependency relationship between different iterative computing tasks are established.

Figure 6B:
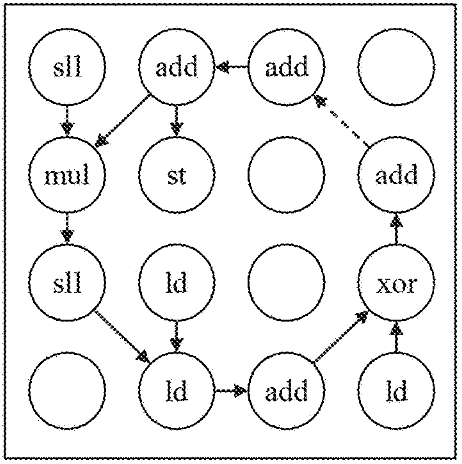
FIG. 6B is a schematic diagram of a cyclic directed graph and an acyclic graph according to this application.
Figure 6B:
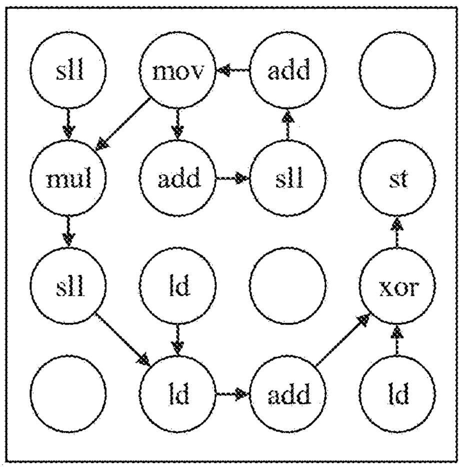

Based on the structure and functions of the foregoing graph computing apparatus, a graph computing task in this application and an iterative computing task included in the graph computing task are further described. FIG. 6B is a schematic diagram of a cyclic directed graph and an acyclic graph according to this application. When a program requires a small amount of data, but a large quantity of recursion operations (a long-time recursion/iteration/convergence operation needs to be performed based on an input initial value for computation), a data flow graph of the program may include a cycle (Cycle) operation, that is, data flows repeatedly in the cycle until a condition is satisfied. The graph computing task in this application is a data flow graph that is based on a graphflow computing model and includes a cycle (Cycle). For example, semantics of a cycle (Cycle) in a program may be represented as data transfer of a deduction/reduction (Induction/Reduction) variable, and semantics of a control cycle (Cycle) in a program may be represented as a loop or recursion (Recursive). After a loop is converted into a graphflow graph, cross-iteration data flowing is represented as backflow (Back Edge/Across Edge).

Figure 6C:
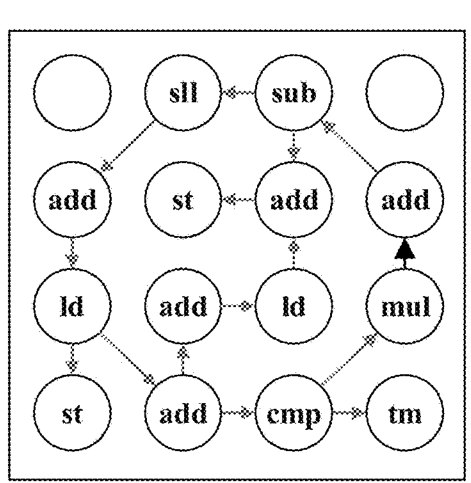
FIG. 6C is a data flow graph of a graph computing task according to an embodiment of the present application.
Figure 6C:
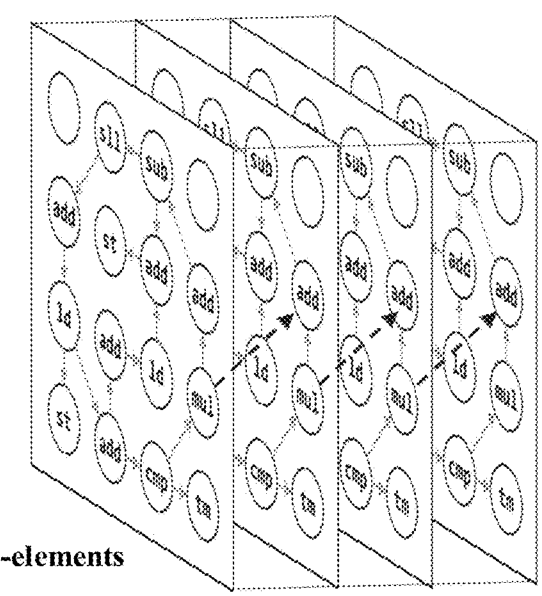

In a data flow graph instruction set architecture (Graphflow ISA) in this application, a normal flow instruction (that is, an intra-iteration graph computing instruction in this application) and a backflow instruction (that is, a cross-iteration graph computing instruction in this application) need to be distinguished. Further description is provided subsequently, and details are not described herein. After the graphflow computing model extracts the backflow instruction separately, the remaining data flow graph may become a directed acyclic graph, so that the directed acyclic graph may be expanded and operated in parallel based on the backflow instruction. For example, FIG. 6C is a data flow graph of a graph computing task according to an embodiment of the present application. FIG. 6C shows a description of a 2D (two-dimensional) data flow graph corresponding to the graph computing task (which may also be referred to as a graph computing program). That is, in this embodiment of the present application, M status buffers may share the data flow graph (that is, P instructions in the graph computing task). For a circulating flow in the figure (it is assumed that mul instruction→add instruction in FIG. 6C is a backflow instruction), a compiler may select to mark an edge in the circulating flow as a cross-iteration graph computing instruction (MoveAcross instruction) in a compilation phase, so that a 2D circulating flow in FIG. 6C may be converted into a 3D spiral, the cross-iteration graph computing instruction is further described in a subsequent implementation, and details are not described herein. Therefore, when a data flow passes through the across instruction, the data flow may transit to a corresponding iterative computing task in a next status buffer through a corresponding bus. In this embodiment of the present application, the M status buffers 1011 may share a set of code, and do not need to be converted into an ultra-large data flow graph, but can still complete performance that can be achieved by computing a fully expanded data flow graph, that is, can complete parallel computing of program nodes in M planes.

In a conventional static data flow architecture, although a data cyclic data flow graph converted from a loop can be correctly executed, for all nodes, one cycle/a plurality of cycles can only allow one iterative operation through back-pressure. However, in the Graphflow ISA in this application, a programmer/compiler needs to distinguish between a normal flow instruction and a backflow instruction in a data flow cycle. In addition, after the graph computing apparatus 11 independently extracts the backflow instruction, the remaining data flow graph may become a directed acyclic graph DAG (for example, a directed acyclic graph may be obtained after a dashed arrow is removed from FIG. 6B), and may be parallelized. In the graph computing apparatus 11, each node may be abstracted as that each operation unit 1013 may support inputs of M different versions. This is equivalent to that four concurrent threads are added to the current node to compute a circulating flow of different loops. If no operation unit is added, an operation can be performed and a result can be sent to a corresponding thread after an input of any version is ready.

Based on the foregoing analysis, it can be learned that, performance improvement of a conventional graph architecture and a superscalar processor mainly depends on parallelism between instructions and concurrent instructions. Usually, inter-instruction parallelism of a superscalar processor is scanned at a width of a reorder buffer (Reorder Buffer, ROB), for example, a ROB of 192 entries (entry). In the conventional graph architecture, parallelism between instructions is scanned in a length of an instruction operand buffer (Instruction Operand Buffer) and extracted using concurrent PEs. However, both architectures are limited to parallelism between instructions logically determined by an original program. In addition to the foregoing two kinds of parallelism, this application further proposes parallelism in a third dimension, that is, parallelism between iterations (Loop Level Parallelism) for a loop. Based on the parallelism between iterations, a cross-iteration dependency (Cross-Iteration Dependency) relationship is introduced in this application, and the cross-iteration dependency relationship is completed by using a data flow plus a control flow that use a same idea as a graph computing architecture. Therefore, instructions of different iterations can be executed simultaneously after the cross-iteration dependency relationship is complied with. In this application, a parallel manner in which instructions of different iterations and a dependency relationship between iterations are transferred in a manner of graph computing flow is referred to as cross-iteration parallel (DoAcross Parallelism).

In conclusion, in this application, for a disadvantage of a conventional dynamic data flow architecture, after an overall design is performed on an instruction set, a compiler, and a processing architecture, a cross-iteration concurrent execution solution of graph computing is implemented. If it is assumed from a hardware perspective that these instructions are repeated, and the compiler determines a dependency relationship between iterations of iterative computing tasks in the graph computing task, hardware expansion may be performed on an iteration loop of the graph computing task by using a status buffer.

Figure 7A:
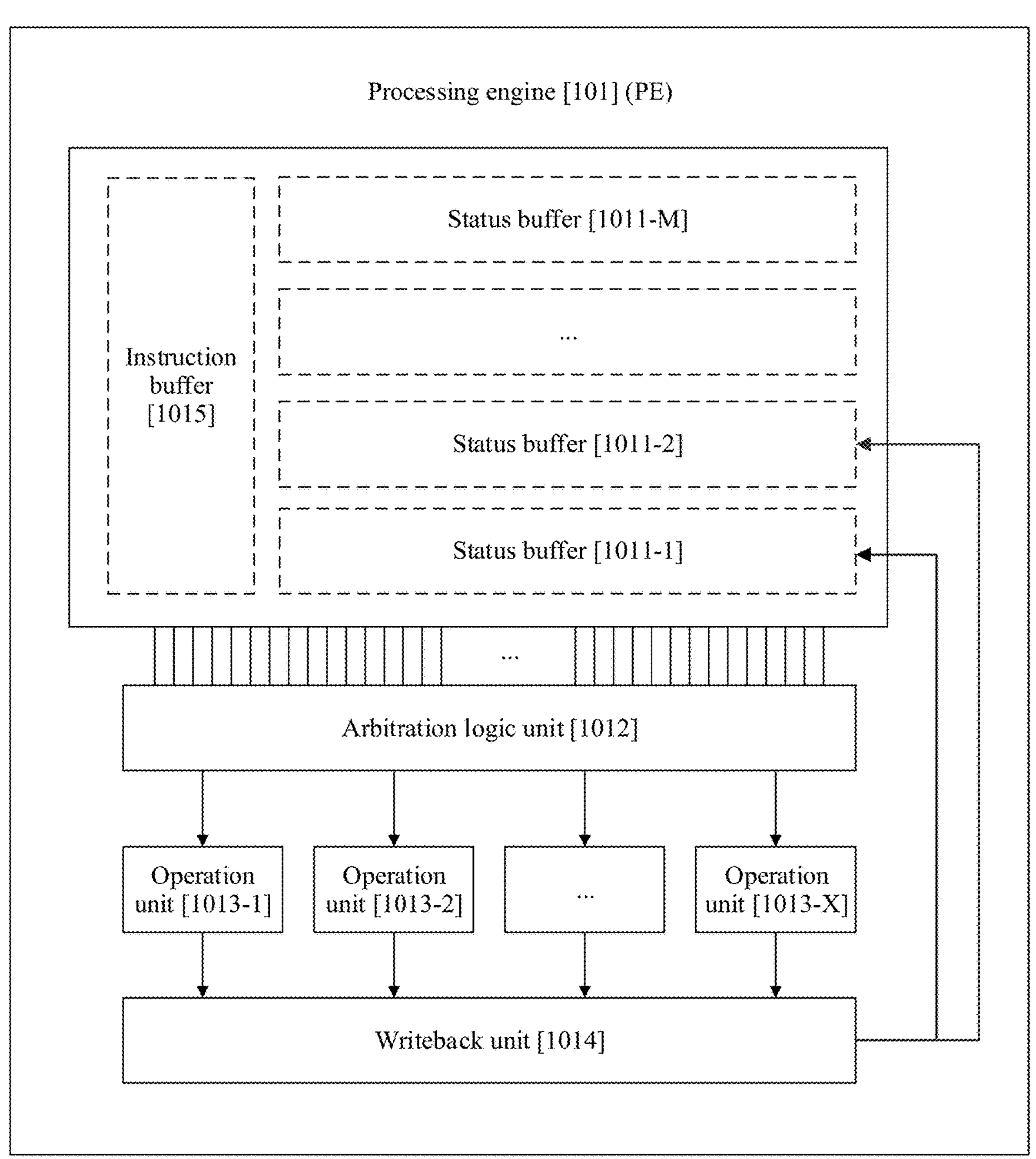
FIG. 7A is a schematic diagram of a structure of another processing engine according to an embodiment of the present application.

In a possible implementation, FIG. 7A is a schematic diagram of a structure of another processing engine according to an embodiment of the present application. Any processing engine 101 in a graph computing apparatus 10 may further include an instruction buffer 1014. It is assumed that the graph computing task includes P graph computing instructions. The instruction buffer 1014 is configured to store the P graph computing instructions. N iterative computing tasks share the P graph computing instructions. Optionally, based on the description of the format of the graph computing instruction in FIG. 3A, the instruction buffer 1014 may be configured to store an instruction ID, an operation code (opcode), and a valid bit (Valid) mark of the graph computing instruction. Actually, instruction content of the N iterative computing tasks of the graph computing task is the same, that is, the instruction ID, the operation code (opcode), and the valid bit (Valid) are the same. Therefore, the M status buffers 1011 may share the P instructions of the graph computing task stored in the instruction buffer 1014. That is, the instruction buffer 1014 needs to store only one set of instructions, and does not need to store a plurality of sets of instructions like status data.

Figure 7B:
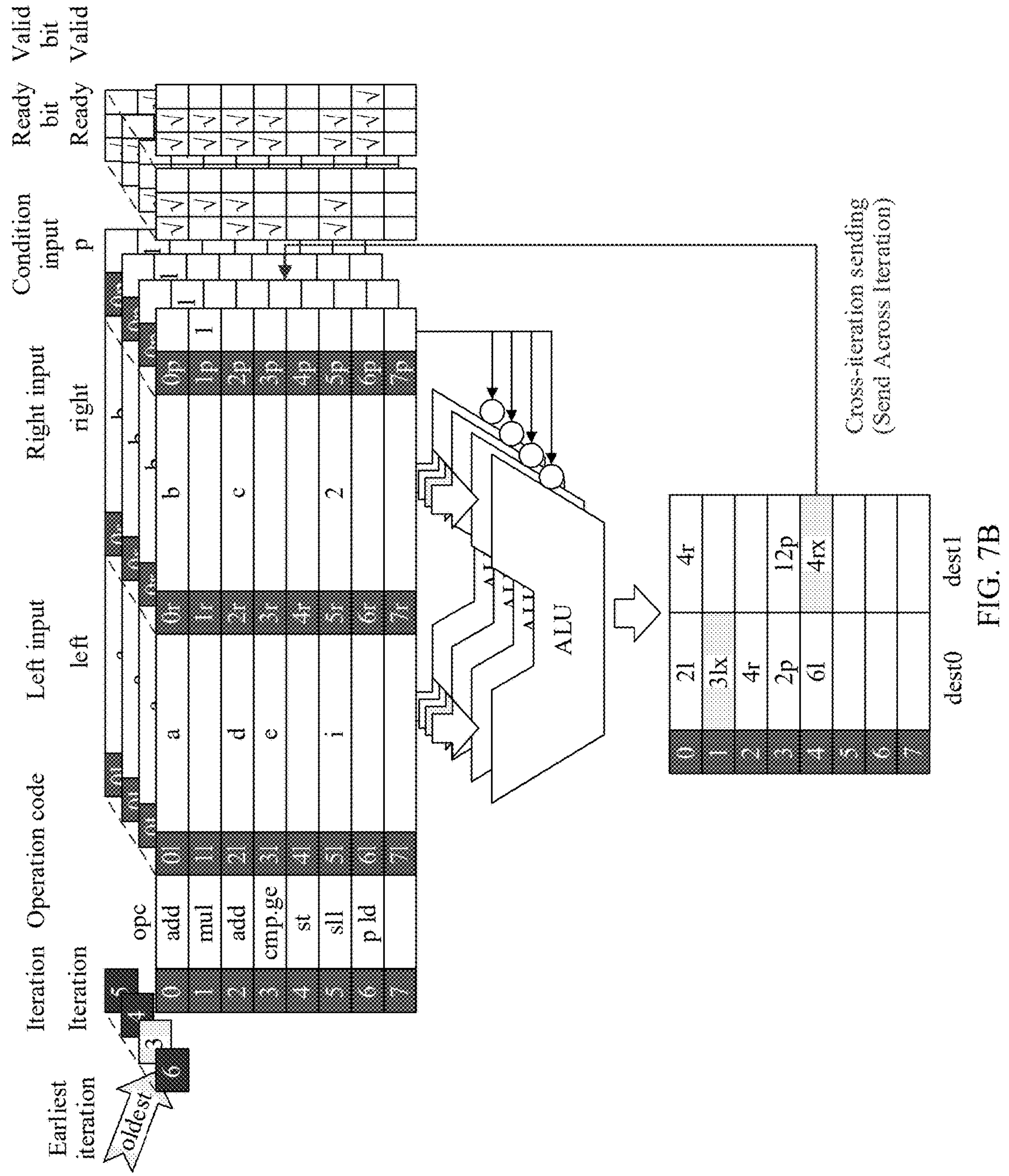
FIG. 7B is a schematic diagram of a model corresponding to an expanded graph computing task in a PE according to an embodiment of the present application.

For example, FIG. 7B is a schematic diagram of a model corresponding to an expanded graph computing task in a PE according to an embodiment of the present application. The model expands, based on the processing engine PE of the cross-iteration (DoAcross) architecture provided in FIG. 6A or FIG. 7A in this application, storage of the graph computing task in an iteration dimension in a status buffer (operand buffer), to improve concurrency of graph computing task execution from an iteration dimension. It is assumed that P=8, X=4, and M=4, that is, the graph computing task includes eight graph computing instructions, and the status buffer is expanded to four times, respectively representing storage expansion of next four iterative computing tasks. The status buffers of the four iterative computing tasks share four operation units (such as an ALU). Specifically, instruction IDs of the eight graph computing instructions included in the graph computing task are respectively 0, 1, 2, 3, 4, 5, 6, and 7, operation codes of the instructions are respectively add, mul, add, cmp.ge, st, sll and pld, left inputs are respectively 0l, 1l, 2l, 3l, 4l, 5l, 6l and 7l, right inputs are respectively 0r, 1r, 2r, 3r, 4r, 5r, 6r and 7r, and condition inputs are respectively 0p, 1p, 2p, 3p, 4p, 5p, 6p and 7p. In addition, each graph computing instruction further corresponds to three ready flag bits that indicates whether a left input, a right input, or a condition input of the current graph computing instruction is ready, and three valid bits that indicate whether the left input, the right input, and the condition input of the current graph computing instruction need to be monitored. In addition, each plane represents one iterative computing task of the graph computing task, for example, in FIG. 7B, respectively corresponding to a third iterative computing task (iteration3), a fourth iterative computing task (iteration4), a fifth iterative computing task (iteration5), and a sixth iterative computing task (iteration6). Graph computing instructions that satisfy an execution condition in the four iterative computing tasks are allocated to four logical operation units (ALU). Operation results of a maximum of four graph computing instructions may be obtained in each clock cycle. A part of the operation results may continue to be returned to an instruction in each iterative computing task as input data of the instruction, and may be a current iteration or a next iteration. This depends on a dependency relationship between the graph computing instructions.

Based on a structure and a function of the graph computing apparatus 11 and the at least one processing engine 101 in the graph computing apparatus 11 provided in this application, the P graph computing instructions included in the graph computing task may include a plurality of graph computing instructions with different functions, to complete different functions in the graph computing task. From perspectives of different functions of the instructions, the graph computing instruction provided in this application includes at least an intra-iteration graph computing instruction, a cross-iteration graph computing instruction, iterative window movement instruction, and a computation end instruction. The following describes features and functions of the foregoing instructions in detail.

In a possible implementation, the graph computing instruction includes an intra-iteration graph computing instruction. The intra-iteration graph computing instruction carries a result address. The writeback unit is configured to send an $i^{th}$ iterative computation result to a result address in a status buffer corresponding to an $i^{th}$ iterative computing task. A value range of i is a positive integer less than or equal to N. The $i^{th}$ iterative computation result is a result obtained by executing the intra-iteration graph computing instruction in the $i^{th}$ iterative computing task in the N iterative computing tasks. For example, in an instruction set, the intra-iteration graph computing instruction in this embodiment of the present application defines that an operation result of a current iteration needs to be transferred only to an instruction of the current iteration. For example, if the intra-iteration graph computing instruction is 1 add 2l, it indicates that a result of the instruction 1add needs to be transferred only to an instruction 2 in the current iterative computing task.

In a possible implementation, the graph computing instruction includes a cross-iteration graph computing instruction. The cross-iteration graph computing instruction carries a result address and a cross-iteration identifier. The writeback unit is configured to send, based on the cross-iteration identifier, an $i^{th}$ iterative computation result to a result address in a status buffer corresponding to an $(i+1)^{th}$ iterative computing task. A value range of i is a positive integer less than or equal to N−1. The $i^{th}$ iterative computation result is a result obtained by executing the cross-iteration graph computing instruction in the $i^{th}$ iterative computing task in the N iterative computing tasks. Specifically, in an instruction set, the cross-iteration graph computing instruction (which may be referred to as a move across or across instruction) in this embodiment of the present application is an instruction that defines an operation result of a current iteration, and may be transferred to a next iteration. Optionally, for the cross-iteration graph computing instruction, in this embodiment of the present application, an across (x) mark needs to be added based on an original destination address. For example, the cross-iteration graph computing instruction is 1 add 2lx, where x is a cross-iteration identifier. The cross-iteration graph computing instruction indicates that a result of the instruction 1add needs to be transferred to an instruction 2 in a next iterative computing task. That is, a result of the original instruction 1add can be transferred only to the instruction 2 in the current iteration. However, by using the cross-iteration identifier (that is, special across destination encoding) in this embodiment of the present application, the instruction 1 may transfer the result of add to the instruction 2 in the next sub-element (a dynamic version). In this way, operations of two iterative computing tasks can be started simultaneously. That is, a specific cross-iteration identifier is carried in an instruction, to establish a cross-iteration data dependency relationship. According to the instruction set provided in this embodiment of the present application, a compiler may distinguish between an intra-iteration dependency relationship and a cross-iteration dependency relationship. In this way, a simple and effective way for hardware to make the most possible use of the information provided by the compiler is provided. By using the cross-iteration move across instruction, the data flow can start a next epoch data flow by using the current iterative computing task (Epoch). By using the across instruction, the PE may automatically expand a planar data flow graph and perform three-dimensional 3D transformation on the planar data flow graph. Data flow flows not only within the current plane but also to a next plane. Each time after backflow (a dashed line in FIG. 7A) of the across mark (a cross-iteration identifier) is performed, a dynamic version number (that is, a quantity of iterations) of the data flow is increased by 1. To be specific, after the graph computing apparatus 11 in this application adds a version number based on the backflow instruction, the data dynamic version number transfers the version number and the data to remaining subgraphs in a form of a token. The hardware may expand a directed acyclic graph without a dynamic version number into a directed acyclic graph with a version number. After the graph computing apparatus 11 performs an expanding operation on the directed cyclic operation, data derived from cycles of different versions may be computed in parallel in different threads. However, the dynamic version number token is allocated by the hardware architecture and can be recycled. This is the same as a reorder buffer entry ID (Reorder Buffer Entry ID) in a superscalar processor and is invisible to the outside.

Figure 8A:
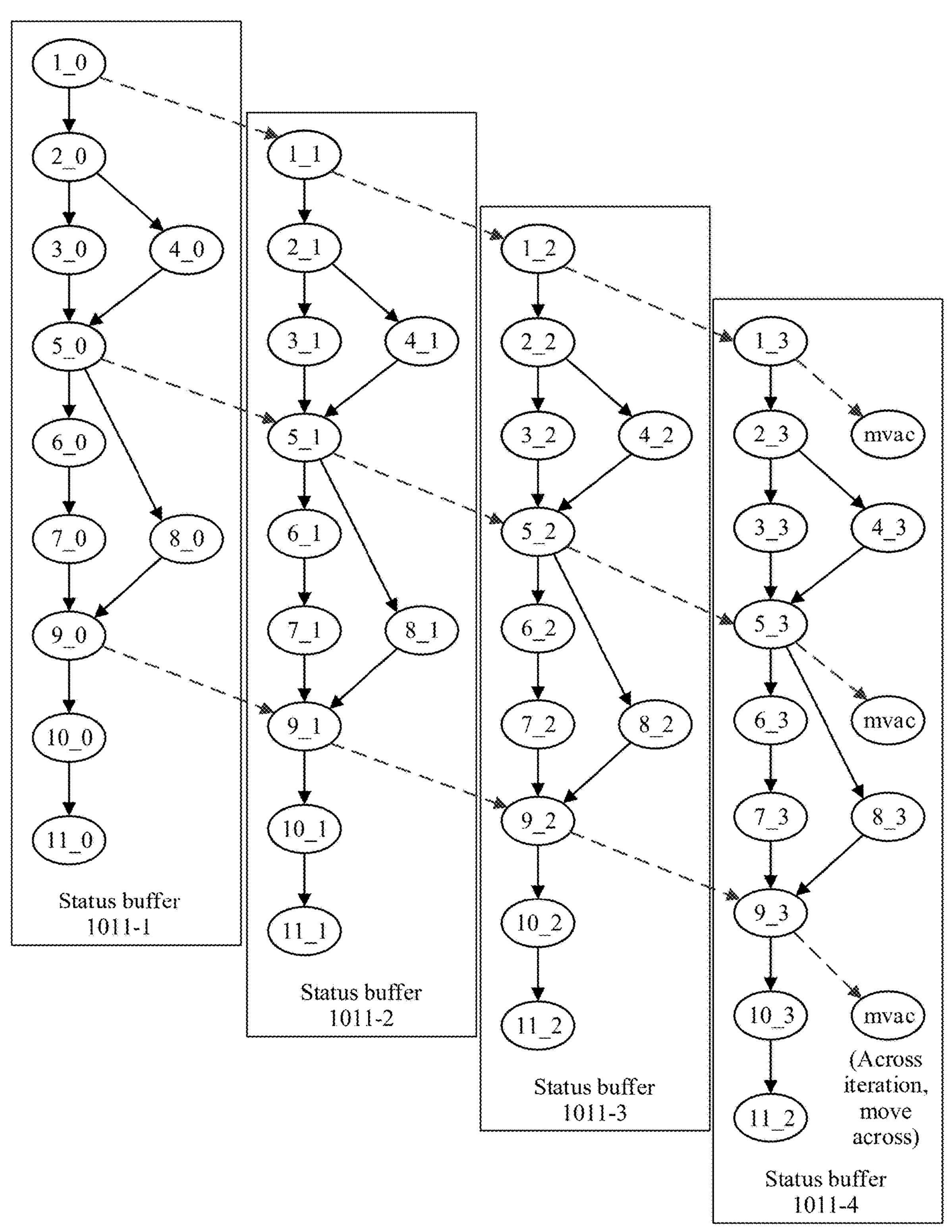
FIG. 8A is a schematic diagram of a dependency relationship of an iterative computing task in a status buffer according to an embodiment of the present application.

FIG. 8A is a schematic diagram of a dependency relationship of an iterative computing task in a status buffer according to an embodiment of the present application. For example, each of status buffers 1011-1, 1011-2, 1011-3, and 1011-4 stores status data of one iterative computing task. It is assumed that a graph computing task includes 11 instructions: an instruction 1, an instruction 2, an instruction 3, an instruction 4, an instruction 5, an instruction 6, an instruction 7, an instruction 8, an instruction 9, an instruction 10, and an instruction 11. In this case, all instructions that are of a first iterative computing task of the graph computing task and that are stored in the status buffer 1011-1 are marked as 1_0, 2_0, 3_0, 4_0, 5_0, 6_0, 7_0, 8_0, 9_0, 10_0 and 11_0. Correspondingly, all instructions that are of a second iterative computing task of the graph computing task and that are stored in the status buffer 1011-2 are marked as 1_1, 2_1, 3_1, 4_1, 5_1, 6_1, 7_1, 8_1, 9_1, 10_1 and 11_1; all instructions that are of a third iterative computing task of the graph computing task and that are stored in the status buffer 1011-3 are marked as 1_2, 2_2, 3_2, 4_2, 5_2, 6_2, 7_2, 8_2, 9_2, 10_2 and 11_2; and all instructions that are of a fourth iterative computing task of the graph computing task and that are stored in the status buffer 1011-4 are marked as 1_3, 2_3, 3_3, 4_3, 5_3, 6_3, 7_3, 8_3, 9_3, 10_3 and 11_3. 1_0 represents an instruction 1 in the first iterative computing task, 2_0 represents an instruction 2 in the first iterative computing task, 3_0 represents an instruction 3 in the first iterative computing task, 1_1 represents an instruction 1 in the second iterative computing task, 2_1 represents an instruction 2 in the second iterative computing task, 3_1 represents an instruction 3 in the second iterative computing task, and so on.

Specifically, each repeated and complete execution of the foregoing eleven instructions is referred to as one "iterative computing task", and a part or all of execution results in each iterative computing task is used as an initial value of a next iterative computing task. It should be noted that the iterative computing task in this application is referred to as iteration, iter for short subsequently, to be specific, the first iterative computing task is referred to as an iter0 for short, the second iterative computing task is referred to as an iter1 for short, and so on. Details are not described again subsequently. In FIG. 8A, for example, after the instruction 1_0 in the iter0 is executed, the instruction 2_0 in the iter0 and the instruction 1_1 in the iter1 may be executed. That is, an execution result of the instruction 1_0 is used as not only an input of the instruction 2 in the first iterative task, but also an input of the instruction 1 in a next iterative computing task. Similarly, an execution result of the instruction 1 in the iter1 is used as not only an input of the instruction 2 in the iter1, but also an input of the instruction 1 in the iter2. An execution result of the instruction 1 in the iter1 is used as not only an input of the instruction 2 in the iter1, but also an input of the instruction 1 in iter2, and so on. That is, in FIG. 8A, a data flow to which a solid line arrow points corresponds to an intra-iteration graph computing instruction, and a data flow to which a dashed line arrow points corresponds to a cross-iteration graph computing instruction. For example, a dashed line data flow to which an instruction 1, an instruction 5, and an instruction 9 in each iterative computing task point corresponds to a cross-iteration graph computing instruction, a solid line data flow to which an instruction 1, an instruction 2, an instruction 3, an instruction 4, an instruction 5, an instruction 6, an instruction 7, an instruction 8, an instruction 9, and an instruction 10 in each iterative computing task point corresponds to an intra-iteration graph computing instruction. Similarly, refer to a dependency relationship of the instruction 1 in each iterative computing task. Details are not described herein again.

Based on any graph computing apparatus 10 provided in this application, after the graph computing instruction 1_0 that is in the iterative computing task iter1 and that corresponds to the status buffer 1011-1 is allocated, by using an arbitration logic unit 1012, to an operation unit (for example, 1013-1) in X operation units 1013 for an operation, the operation unit 1013-1 sends, to a writeback unit 1014, a computation result obtained by executing the graph computing instruction 1_0. Because the graph computing instruction 1_0 (a dashed line edge) is a cross-iteration graph computing instruction, the writeback unit 1014 needs to write the computation result of the instruction 1_0 back to a result address in the status buffer 1011-1 corresponding to the iter1, that is, an address at which status data of the instruction 2_0 is stored. In a next clock cycle, when the graph computing instruction 2_0 that is in the iterative computing task iter0 and that corresponds to the status buffer 1011-1 is allocated, by using an arbitration logic unit 1012, to an operation unit (for example, 1013-2) of the X operation units 1013 for an operation, the operation unit 1013-2 sends, to the writeback unit 1014, a computation result obtained by executing the graph computing instruction 2_0. Because the graph computing instruction 2_0 is an intra-iteration graph computing instruction, the writeback unit 1014 needs to write the computation result of the instruction 2_0 back to a result address in the status buffer 1011-1 corresponding to the iter0, that is, an address at which status data of the instruction 3_0 and the instruction 4_0 is stored.

Figure 8B:
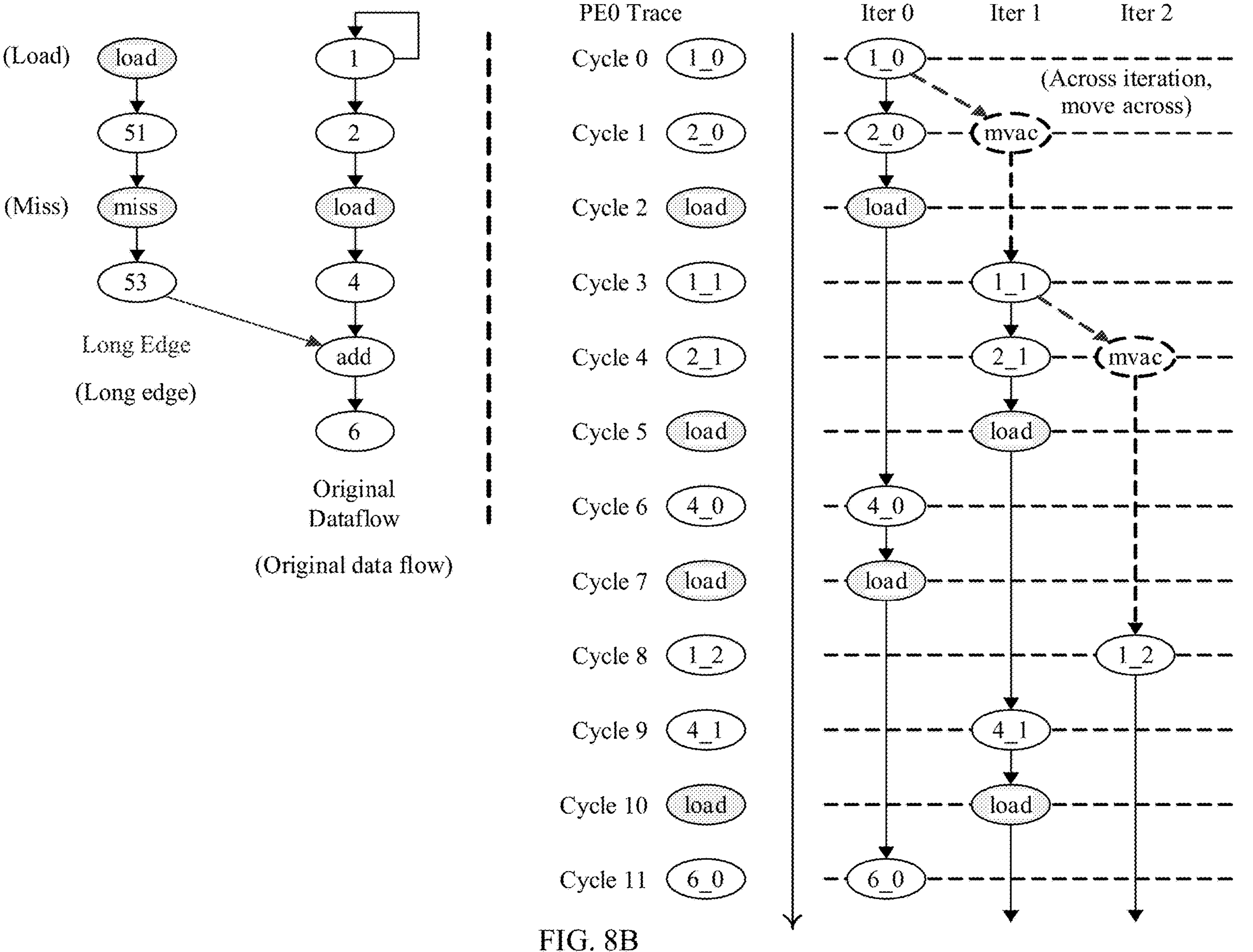
FIG. 8B is a schematic diagram of an operation unit executing an instruction in a graph computing task in a plurality of clock cycles according to an embodiment of the present application.

FIG. 8B is a schematic diagram of an operation unit executing an instruction in a graph computing task in a plurality of clock cycles according to an embodiment of the present application. There are 12 consecutive clock cycles: a cycle 0, a cycle 1, a cycle 2, a cycle 3, a cycle 4, a cycle 5, a cycle 6, a cycle 7, a cycle 8, a cycle 9, a cycle 10 and a cycle 11. It is assumed that an instruction 1_0, an instruction 2_0, and an instruction load in an iter0 are executed in the cycle 0, the cycle 1, and the cycle 2. An instruction 1_1, an instruction 2_1, and an instruction load in an iter1 are executed in the cycle 3, the cycle 4, and the cycle 5. An instruction 4_0 and an instruction load in the iter0 are separately executed in the cycle 6 and the cycle 7. An instruction 1_2 in an iter2 is executed in the cycle 8. An instruction 4_1 and an instruction load in the iter1 are respectively executed in the cycle 9 and the cycle 10. An instruction 6_0 in the iter0 is executed in the cycle 11. That is, for any operation unit in the X operation units, the operation unit may execute, in different clock cycles, any graph computing instruction whose input data is ready in different iterative computing tasks. That is, any operation unit may execute an instruction whose input data is ready in any iterative computing task in the M status buffers. In addition, other instructions of the iterative computing tasks are independent of each other and do not interfere with each other different from instructions that have a dependency relationship, and can be executed as long as input data is ready. Therefore, parallelism can be greatly improved.

In this embodiment of the present application, cross-iteration concurrent execution can significantly improve performance of a conventional data flow architecture. In this application, excessive bubbles (bubble) caused by load miss, communication, and the like in a conventional architecture may be filled by an instruction in a subsequent iterative computing task. Therefore an IPC indicator can be significantly improved.

In a possible implementation, the writeback unit is specifically configured to: when computation results corresponding to a plurality of iterative computing tasks need to be separately written back to corresponding status buffers, preferentially write a computation result corresponding to an earlier-iterated iterative computing task back to a status buffer corresponding to the iterative computing task with the earlier iteration. Specifically, when the computation results corresponding to the plurality of iterative computing tasks need to be separately written back to the corresponding status buffers, the writeback unit preferentially writes a result of an earlier-iterated iterative computing task back to a corresponding status buffer, to complete the iterative computing task with the earlier iteration as early as possible, and start a new iterative computing task and complete N iterative computing tasks of the graph computing task as soon as possible. Because the graph computing task includes the N iterative computing tasks, and usually, a value of N is large and a value of X is small, a plurality of iterative computing tasks may be executed to complete the N iterative computing tasks of the graph computing task. However, during replacement of status data of the plurality of iterative computing tasks, data of a new iterative computing task can be loaded only after computation of an earlier iterative computing task is completed and corresponding status data is cleared. That is, if a computation result of an iterative computing task with an earlier (oldest) iteration is preferentially written back, the iterative computing task with the earlier (oldest) iteration can be completed and cleared more quickly. In this way, a new iterative computing task can be loaded into a status buffer as soon as possible. This improves overall computation efficiency.

In a possible implementation, the graph computing instruction includes an iterative window movement instruction. Each status buffer is further configured to: when computation of a graph computing instruction in a $j^{th}$ iterative computing task is completed, clear, based on the iterative window movement instruction, status data in a status buffer corresponding to the $j^{th}$ iterative computing task, and load status data of a $(j+M)^{th}$ computing task into a cleared status buffer. The $j^{th}$ iterative computing task is an earliest iterative computing task in an iterative computing task currently corresponding to the M status buffers. Because a storage capacity of a graph computing apparatus 10 is limited, the graph computing apparatus 10 cannot be expanded without limitation. Therefore, in this embodiment of the present application, a window is automatically constructed in an iteration direction of the graph computing architecture based on a hardware capacity of the graph computing apparatus, and all nodes in the window can run concurrently. After an iterative computing task (Epoch) in the front of the window is executed, a next epoch is started by moving the window. Optionally, each iterative computing task in this application corresponds to one token, and a current earliest (oldest) iteration is marked. After the oldest iterative computing task is executed, the mark is transferred to a next adjacent iteration. For example, when status data of a first iterative computing task, a second iterative computing task, a third iterative computing task, and a fourth iterative computing task is separately stored in M status buffers (it is assumed that M=4), after the oldest first iterative computing task is executed, a mark of the oldest may be transferred to the next adjacent second iterative computing task, that is, the second iterative computing task becomes earliest (Oldest). For logic of selecting the L graph computing instructions, in this application, a graph computing instruction with an oldest iteration may be preferentially selected, and a selection priority is arranged based on an old or young degree of iteration. For each PE, if there is no operation that can be performed in the current iteration, the PE may perform an operation in a next iteration. This is equivalent to that the PE in the graph computing apparatus in this application may fill a bubble in a current iteration by using an instruction that needs to be computed in a subsequent iteration. In this way, current computation can be effectively improved.

Figure 9A:
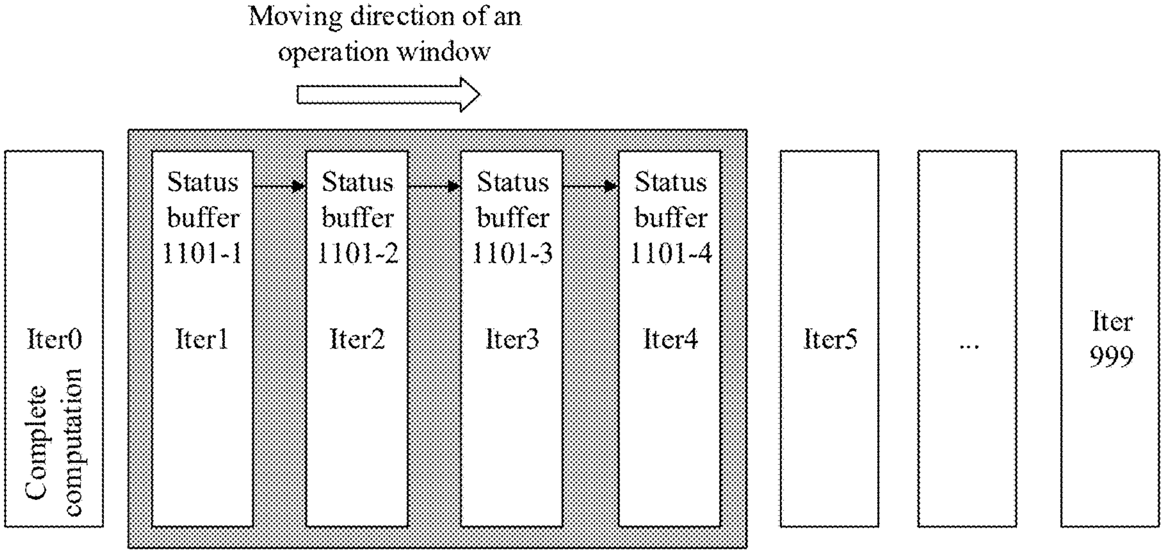
FIG. 9A is a schematic diagram of an iteration window according to an embodiment of the present application.
Figure 9B:
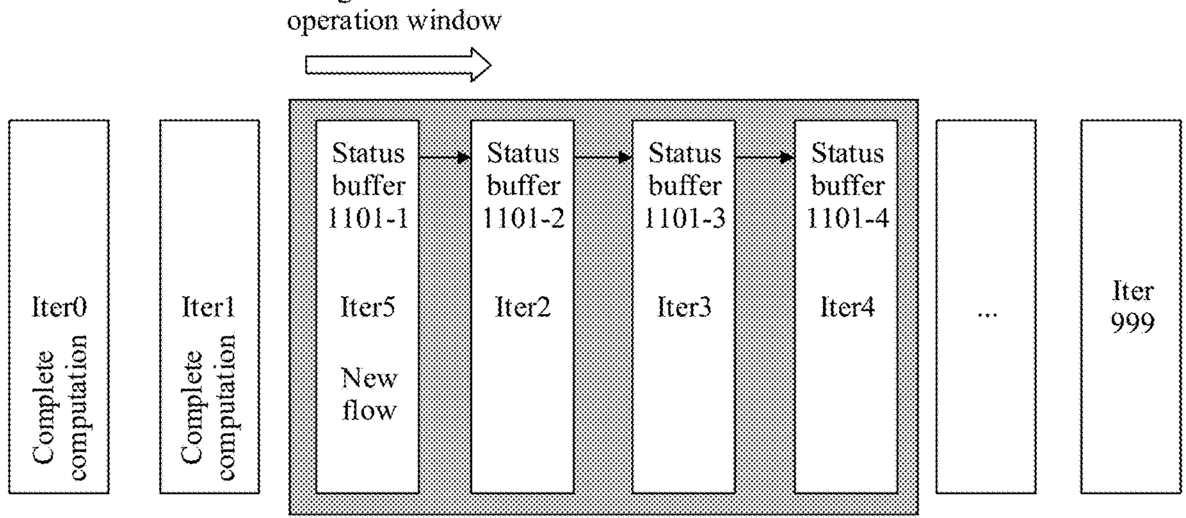
FIG. 9B is a schematic diagram of a moved iteration window according to an embodiment of the present application.

For example, FIG. 9A is a schematic diagram of an iteration window according to an embodiment of the present application; and FIG. 9B is a schematic diagram of a moved iteration window according to an embodiment of the present application. FIG. 9A and FIG. 9B show a solution in which M status buffers (it is assumed that M=4) provided by a graph computing apparatus in an embodiment of the present application complete a plurality of or even infinite software statuses by moving an iteration window. An arrow shown in FIG. 9A is an across data flow channels. Each status buffer may be considered as one iteration loop, that is, status data of one iterative computing task of the graph computing task is stored. It is assumed that the graph computing task in this application has 10000 iteration loops (that is, an iterative computing task). In this case, a graph computing apparatus 11 in this application may provide parallel operations of M=4 iterations. It is assumed that a current status buffer 1011-1 stores status data of a $j^{th}$ iterative computing task (it is assumed that the status data is an iter1), a status buffer 1011-2 stores status data of a $(j+1)^{th}$ iterative computing task (an iter2), a status buffer 1011-3 stores status data of a $(j+2)^{th}$ iterative computing task (an iter3), and a status buffer 1011-4 stores status data of a $(j+3)^{th}$ iterative computing task (an iter4). As shown in FIG. 9B, when computation of a graph computing instruction in the $j^{th}$ iterative computing task is completed, the iteration window moves backwards, and status data of a $(j+4)^{th}$ computing task (an iter5) may be loaded into the cleared status buffer 1011-1, that is, the status data of the sixth iterative computing task iter5 may flow in. The four status buffers that are in the gray part and that are framed by the iteration window represent iterative computing tasks that are currently loaded into the M status buffers in the graph computing apparatus 11, and other white parts that are not framed are iterative computing tasks that are completed or iterative computing tasks that wait to be loaded. Moving the window backwards specifically refers to first clearing status data in the iterative computing task (the iter1) corresponding to the status buffer 1011-1, and then loading status data of a $(j+M)^{th}$ computing task (the iter5) into a cleared status buffer.

In a possible implementation, the writeback unit is further configured to: before the status data of the $(j+M)^{th}$ computing task is loaded into the cleared status buffer, forbid sending a computation result of a $(j+M-1)^{th}$ iterative computing task to the status buffer corresponding to the $(j+M)^{th}$ iterative computing task; and after the status data of the $(j+M)^{th}$ computing task is loaded into the cleared status buffer, allow sending the computation result of the $(j+M-1)^{th}$ iterative computing task to the status buffer corresponding to the $(j+M)^{th}$ iterative computing task. Specifically, because a quantity M of status buffers is limited, when computation of M iterative computing tasks corresponding to the M status buffers are not completed currently, no space is available for loading status data of a new iterative computing task. Therefore, a latest iterative computing task that is not computed can be loaded only after at least one of the M iterative computing tasks in the current round of iterative computing is completed. In addition, in this embodiment of the present application, each repeated execution of the graph computing task is referred to as one "iteration", and a result obtained by executing each iterative computing task is used as an initial value of a next iterative computing task. That is, there is a direct data dependency relationship between two consecutive iterative computing tasks. Therefore, based on an association relationship between iterations, in this embodiment of the present application, status data of a latest iterative computing task that is not computed is loaded only when execution of a current earliest (oldest) iterative computing task is completed, to ensure that the M iterative computing tasks in the M status buffers are always continuous. This avoids a computation disorder caused by that an instruction window cannot move based on an oldest status buffer because of discontinuity between M parallel iterative tasks, and improves overall computation efficiency of the graph computing task.

Figure 9C:
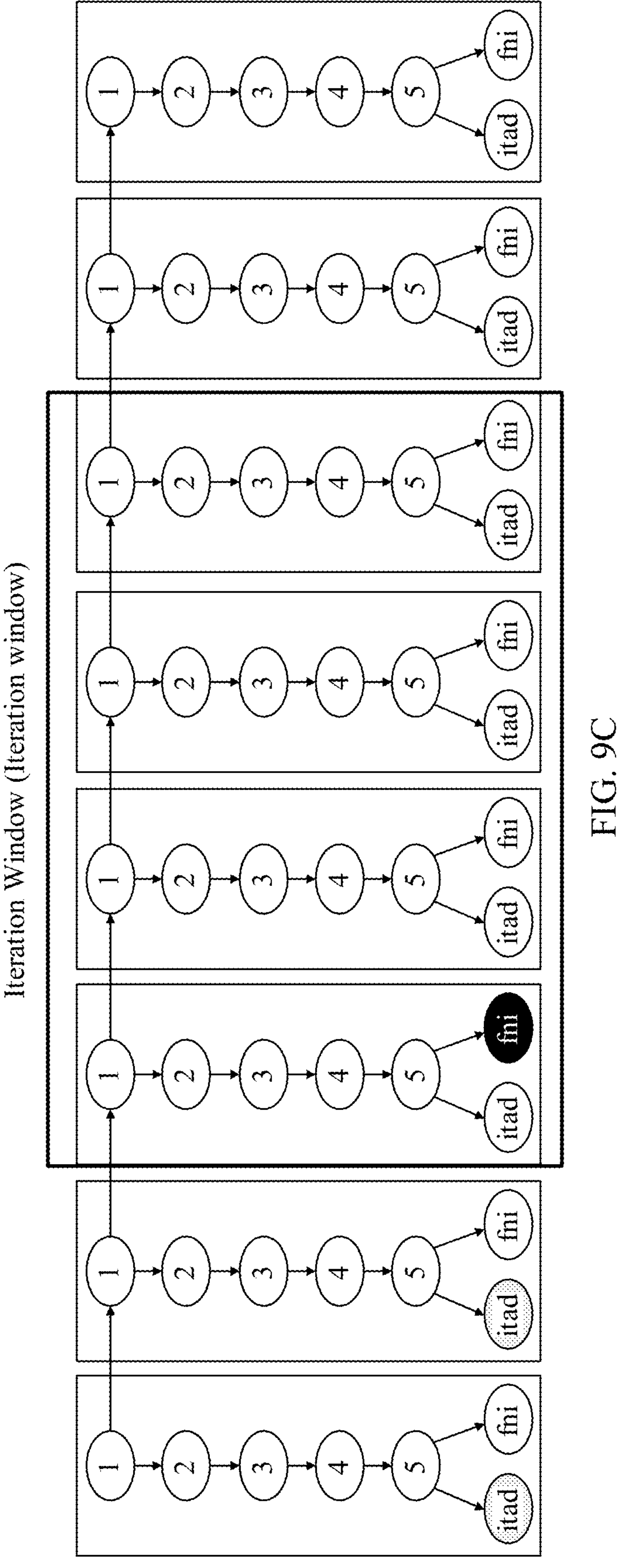
FIG. 9C is a schematic diagram of cyclic execution of an iterative computing task according to an embodiment of the present application.
Figure 9D:
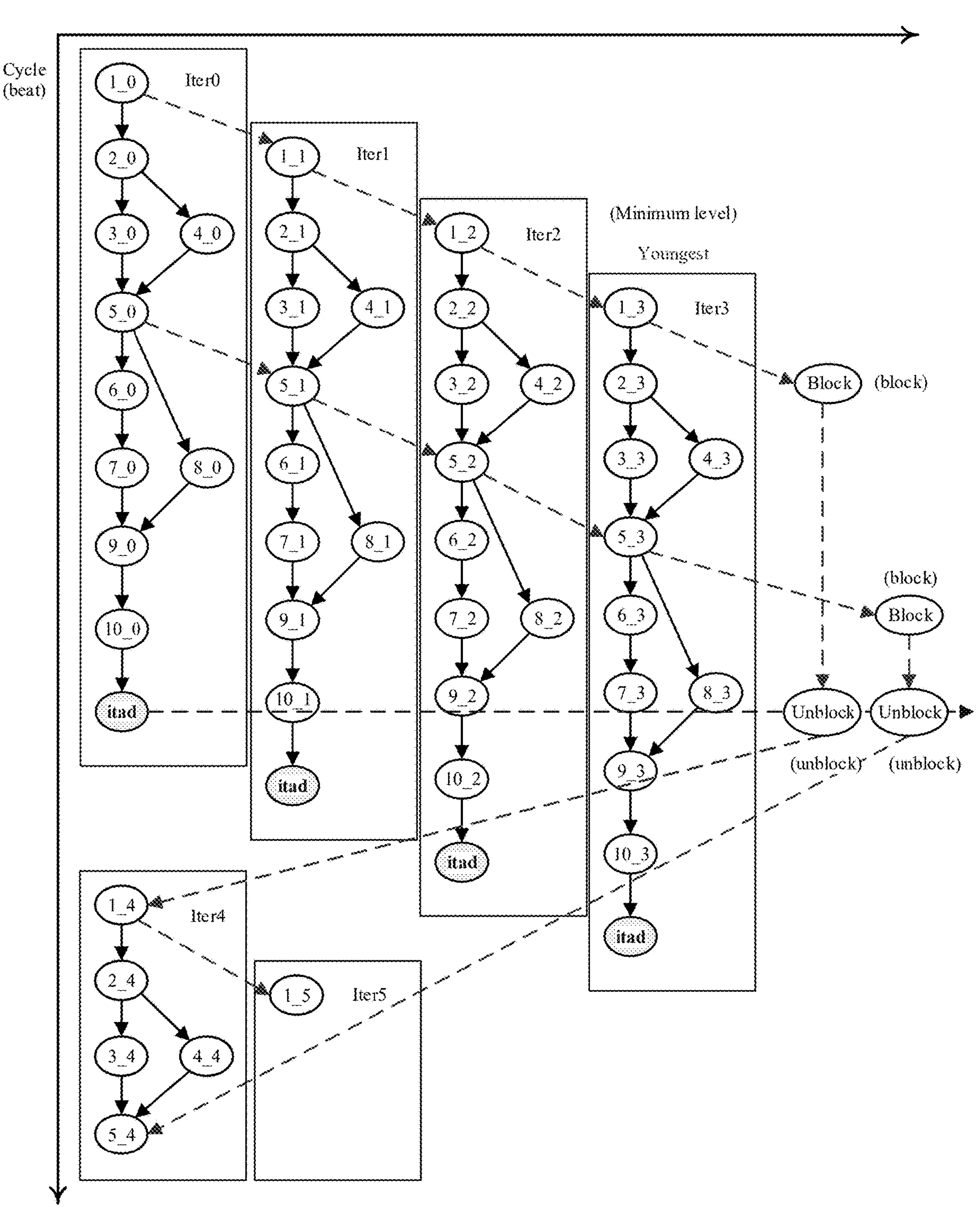
FIG. 9D is a schematic diagram of establishing a new iterative computing task according to an embodiment of the present application.

FIG. 9C is a schematic diagram of cyclic execution of an iterative computing task according to an embodiment of the present application. In order to ensure that a window moves hardware as soon as possible to improve performance, an arbitration logic unit 1012 preferentially selects an operation of a first epoch to move the window. For an instruction set, in this application, an iterative window movement instruction (which may be named an itad instruction) is designed, and a window is moved backward by using hardware. Only an epoch that has the oldest can execute the itad instruction and ensure that all instructions of the current epoch are executed. This ensures that each iterative computing task submits (commit) its own storage buffer (store buffer) in sequence to ensure program correctness. FIG. 9D is a schematic diagram of establishing a new iterative computing task according to an embodiment of the present application. After an Itad instruction is executed, a mark of a current epoch is converted from the oldest to the youngest, and a next adjacent epoch is marked as oldest. The youngest epoch is not selected when a move across instruction is executed. This ensures that instructions in a window do not transfer data to a subsequent epoch. As shown in FIG. 9D, the current instruction can be sent only after the current oldest epoch instruction is executed and the current instruction is no longer the youngest.

In a possible implementation, the graph computing instruction includes a computation end instruction. Each status buffer is further configured to: when computation of an $N^{th}$ iterative computing task in the N iterative computing tasks is completed, clear, based on the computation end instruction, status data of an iterative computing task that exceeds the $N^{th}$ iterative computing task, and exit a loop. For example, exiting the loop may be that a writeback unit 1014 transfers a computation result to a result writeback unit 125 of the CPU, enters the reorder buffer and writes the result into a register of the CPU, and after the output is completed, clears all status buffers. In this embodiment of the present application, when the $N^{th}$ iterative computing task is computed, if no computation end instruction is received, the cyclic iterative computing task may continue to be executed, that is, an expected quantity of iterations is exceeded, and an overflow effect of instruction execution is generated. Therefore, in this embodiment of the present application, the computation end instruction is for clearing related data of an overflowed iterative computing task while instructing the graph computing task to suspend computation, to avoid a computation result error caused by an overflow effect of executing the iterative computing task.

Figure 9E:
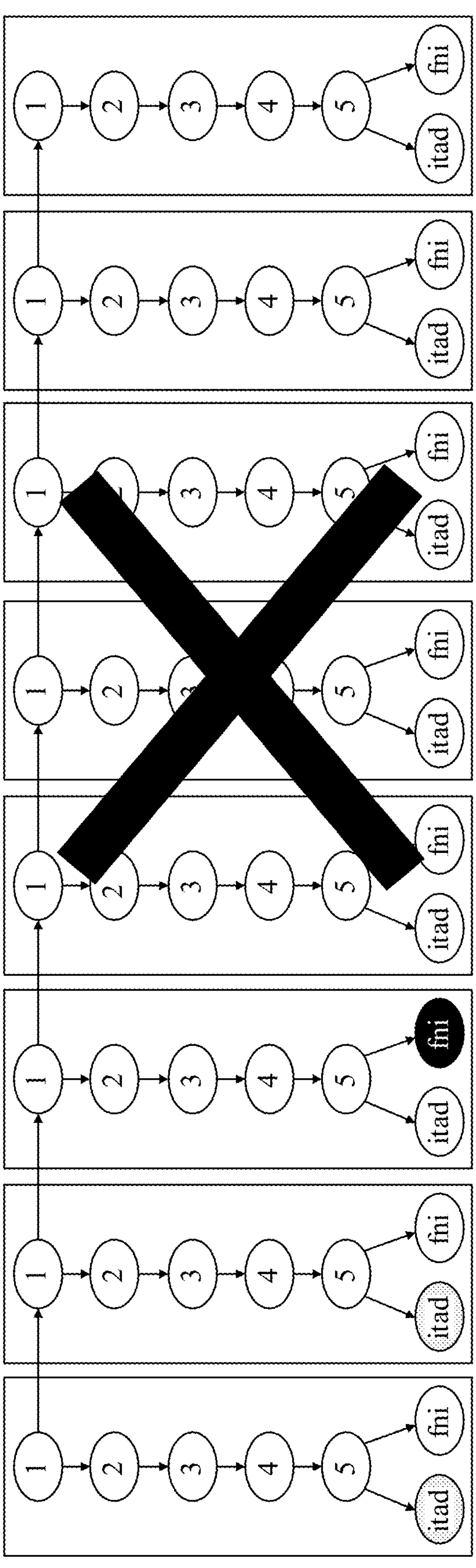
FIG. 9E is a schematic diagram of preventing further submission of an iterative computing task according to an embodiment of the present application.

FIG. 9E is a schematic diagram of preventing further submission of an iterative computing task according to an embodiment of the present application. When a loop arrives a last iteration, it is possible that a future epoch is also expanded. In this embodiment of the present application, it is assumed that before execution of an itad instruction is not completed in an oldest (oldest) epoch, another subsequent epoch is speculatively executed. In this way, after the last iteration arrives, the itad instruction is not executed in the last iteration, but a computation end instruction (which may be referred to as an fni instruction in this application) that exits a loop is executed. Therefore, an iteration that exceeds the execution scope need to be cleared, including a storage buffer (store buffer) of a future iterative computing task (Epoch). If an error occurs in some instructions (for example, a load instruction) of the future epoch, a memory read/write error (memory fault) is ignored, and execution of the entire graph computing apparatus is not affected. If an error occurs in a load instruction of the current oldest epoch, the original program is faulty.

Figure 10:
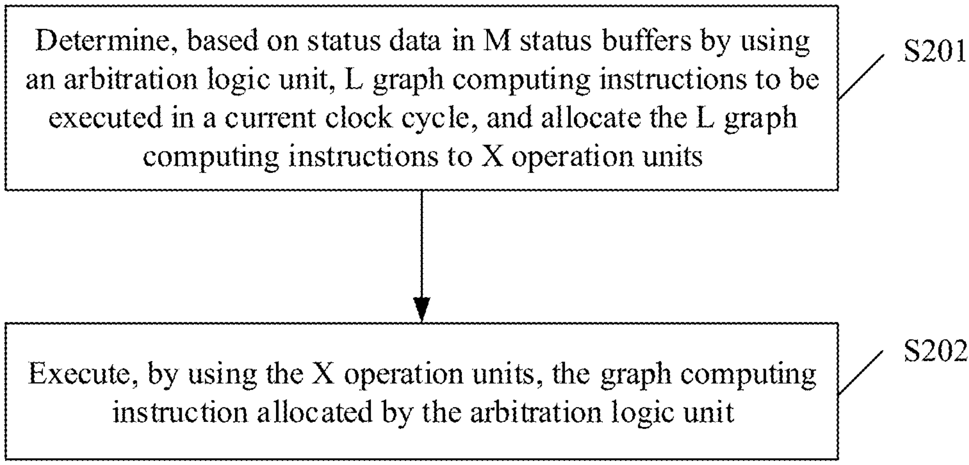
FIG. 10 is a schematic flowchart of a processing method according to an embodiment of the present application.

FIG. 10 is a schematic flowchart of a processing method according to an embodiment of the present application. The processing method is applied to a graph computing apparatus. The graph computing apparatus includes at least one processing engine PE. Each of the at least one PE includes M status buffers, an arbitration logic unit, and X operation units. M is an integer greater than 1, and X is an integer greater than or equal to 1. Each of the M status buffers stores status data of one iterative computing task. The one iterative computing task is one of N iterative computing tasks included in a graph computing task, and N is an integer greater than 1. In addition, the processing method is applicable to any graph computing apparatus in FIG. 1 to FIG. 3C and a device (such as a mobile phone, a computer, or a server) including the graph computing apparatus. The method may include the following steps S201 and S202.

Step S201: Determine, based on status data in the M status buffers by using the arbitration logic unit, L graph computing instructions to be executed in a current clock cycle, and allocate the L graph computing instructions to the X operation units, where the L graph computing instructions are instructions respectively corresponding to T iterative computing tasks, the N iterative computing tasks include the T iterative computing tasks, and both L and T are integers greater than or equal to 1 and less than or equal to X.

Step S201: Execute, by using the X operation units, the graph computing instruction allocated by the arbitration logic unit.

In a possible implementation, the graph computing task includes P graph computing instructions. The apparatus further includes an instruction buffer. The instruction buffer stores the P graph computing instructions. The N iterative computing tasks share the P graph computing instructions.

In a possible implementation, the graph computing task includes the P graph computing instructions. The status data of the one iterative computing task includes input data of the P graph computing instructions in a corresponding iterative computing task. The determining, based on status data in the M status buffers by using the arbitration logic unit, L graph computing instructions to be executed in a current clock cycle, and allocating the L graph computing instructions to the X operation units includes: monitoring, by using the arbitration logic unit, whether the input data that is of the P graph computing instructions in the corresponding iterative computing task and that is in the M status buffers is ready; selecting, from graph computing instructions whose current input data is ready, L graph computing instructions corresponding to the earliest T iterative computing tasks in the corresponding iterative computing task, where one or more graph computing instructions are selected from one iterative computing task; and allocating, from the instruction buffer, the L graph computing instructions to L operation units in the X operation units, where one operation unit corresponds to one graph computing instruction.

In a possible implementation, the processing engine further includes a writeback unit. The X operation units are separately connected to the writeback unit. The method further includes: sending, to the writeback unit by using the X operation units, a computation result obtained by executing the graph computing instruction.

In a possible implementation, the graph computing instruction includes an intra-iteration graph computing instruction. The intra-iteration graph computing instruction carries a result address. The method further includes: sending, by using the writeback unit, an $i^{th}$ iterative computation result to a result address in a status buffer corresponding to an $i^{th}$ iterative computing task. A value range of i is a positive integer less than or equal to N. The $i^{th}$ iterative computation result is a result obtained by executing the intra-iteration graph computing instruction in the $i^{th}$ iterative computing task in the N iterative computing tasks.

In a possible implementation, the graph computing instruction includes a cross-iteration graph computing instruction. The cross-iteration graph computing instruction carries a result address and a cross-iteration identifier. The method further includes: sending, based on the cross-iteration identifier by using the writeback unit, an $i^{th}$ iterative computation result to a result address in a status buffer corresponding to an $(i+1)^{th}$ iterative computing task. A value range of i is a positive integer less than or equal to N−1. The $i^{th}$ iterative computation result is a result obtained by executing the cross-iteration graph computing instruction in the $i^{th}$ iterative computing task in the N iterative computing tasks.

In a possible implementation, when computation results corresponding to a plurality of iterative computing tasks need to be separately written back to corresponding status buffers, the writeback unit preferentially writes a computation result corresponding to an earlier-iterated iterative computing task back to a status buffer corresponding to the iterative computing task with the earlier iteration.

In a possible implementation, the graph computing instruction includes an iterative window movement instruction, and the method further includes:

when computation of a graph computing instruction in a $j^{th}$ iterative computing task is completed, clearing, based on the iterative window movement instruction by using the M status buffers, status data in a status buffer corresponding to the $j^{th}$ iterative computing task, and loading status data of a $(j+M)^{th}$ computing task into a cleared status buffer, where the $j^{th}$ iterative computing task is an earliest iterative computing task in an iterative computing task currently corresponding to the M status buffers.

In a possible implementation, the method further includes: before the status data of the $(j+M)^{th}$ computing task is loaded into the cleared status buffer, forbidding, by using the writeback unit, sending a computation result of a $(j+M-1)^{th}$ iterative computing task to the status buffer corresponding to the $(j+M)^{th}$ iterative computing task; and after the status data of the $(j+M)^{th}$ computing task is loaded into the cleared status buffer, allowing, by using the writeback unit, sending the computation result of the $(j+M-1)^{th}$ iterative computing task to the status buffer corresponding to the $(j+M)^{th}$ iterative computing task.

In a possible implementation, the graph computing instruction includes a computation end instruction. The method further includes: when computation of an $N^{th}$ iterative computing task in the N iterative computing tasks is completed, clearing, based on the computation end instruction by using the M status buffers, status data of an iterative computing task that exceeds the $N^{th}$ iterative computing task, and exiting a loop.

It should be noted that, for a specific procedure of the processing method described in this embodiment of the present application, refer to related descriptions in embodiments of the present application in FIG. 1 to FIG. 9D, and details are not described herein again.

An embodiment of the present application further provides a computer-readable storage medium. The computer-readable storage medium may store a program. When the program is executed by a processor, the processor is enabled to perform a part or all of the steps described in any one of the foregoing method embodiments.

An embodiment of the present application further provides a computer program. The computer program includes instructions. When the computer program is executed by a multi-core processor, the processor is enabled to perform a part or all of the steps described in any one of the foregoing method embodiments.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, a person skilled in the art should appreciate that this application is not limited to the described order of the actions, because according to this application, some steps may be performed in another order or simultaneously. It should be further appreciated by a person skilled in the art that embodiments described in this specification all belong to example embodiments, and the involved actions and modules are not necessarily required by this application.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like, and specifically may be a processor in a computer device) to perform all or some of the steps of the methods described in embodiments of this application. The foregoing storage medium includes any medium that can store program code, such as a USB flash drive, a removable hard disk, a magnetic disk, an optical disc, a read-only memory (Read-Only Memory, ROM for short), or a random access memory (Random Access Memory, RAM for short).

The foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. An apparatus, wherein the apparatus comprises at least one processing engine (PE) and an instruction buffer, each of the at least one PE comprises M status buffers, an arbitration logic circuit, and X operation circuits, Mis an integer greater than 1, and X is an integer greater than 1, wherein each of the M status buffers is configured to store status data of one iterative computing task, wherein the one iterative computing task is one of N iterative computing tasks comprised in a graph computing task, and N is an integer greater than 1, the graph computing task comprises P graph computing instructions, and the status data of the one iterative computing task comprises input data of the P graph computing instructions in a corresponding iterative computing task;

the instruction buffer is configured to store the P graph computing instructions, wherein the N iterative computing tasks share the P graph computing instructions;

the arbitration logic circuit is configured to:

determine, based on the status data in the each of the M status buffers, L graph computing instructions to be executed in a current clock cycle, and allocate the L graph computing instructions to the X operation circuits, wherein the L graph computing instructions are instructions respectively corresponding to T iterative computing tasks, the N iterative computing tasks comprise the T iterative computing tasks, and both L and T are integers greater than or equal to 1 and less than or equal to X; and each of the X operation circuits is configured to execute a graph computing instruction allocated by the arbitration logic circuit.

2. The apparatus according to claim 1, wherein the arbitration logic circuit is specifically configured to:

monitor whether the input data that is of the P graph computing instructions in the corresponding iterative computing task and that is in the M status buffers is ready;

select, from graph computing instructions whose current input data is ready, L graph computing instructions corresponding to the earliest T iterative computing tasks in the corresponding iterative computing task, wherein one or more graph computing instructions are selected from one iterative computing task; and allocate, from the instruction buffer, the L graph computing instructions to L operation circuits in the X operation circuits, wherein one operation circuit corresponds to one graph computing instruction.

3. The apparatus according to claim 1, wherein the at least one PE further comprises a writeback circuit, and the X operation circuits are separately connected to the writeback circuit; and each of the X operation circuits is further configured to send, to the writeback circuit, a computation result obtained by executing the graph computing instruction.

4. The apparatus according to claim 3, wherein the graph computing instruction comprises an intra-iteration graph computing instruction, and the intra-iteration graph computing instruction carries a result address; and the writeback circuit is configured to send an $i^{th}$ iterative computation result to a result address in a status buffer corresponding to an $i^{th}$ iterative computing task, wherein a value range of i is a positive integer less than or equal to N, and the $i^{th}$ iterative computation result is a result obtained by executing the intra-iteration graph computing instruction in the $i^{th}$ iterative computing task in the N iterative computing tasks.

5. The apparatus according to claim 3, wherein the graph computing instruction comprises a cross-iteration graph computing instruction, and the cross-iteration graph computing instruction carries a result address and a cross-iteration identifier; and the writeback circuit is configured to send, based on the cross-iteration identifier, an $i^{th}$ iterative computation result to a result address in a status buffer corresponding to an $(i+1)^{th}$ iterative computing task, wherein a value range of i is a positive integer less than or equal to N−1, and the $i^{th}$ iterative computation result is a result obtained by executing the cross-iteration graph computing instruction in the $i^{th}$ iterative computing task in the N iterative computing tasks.

6. The apparatus according to claim 4, wherein the writeback circuit is specifically configured to:

in response to determining that computation results corresponding to a plurality of iterative computing tasks need to be separately written back to corresponding status buffers, preferentially write a computation result corresponding to an earlier-iterated iterative computing task back to a status buffer corresponding to the iterative computing task with the earlier iteration.

7. The apparatus according to claim 3, wherein the graph computing instruction comprises an iterative window movement instruction, and each status buffer is further configured to:

in response to determining that computation of a graph computing instruction in a $j^{th}$ iterative computing task is completed, clear, based on the iterative window movement instruction, status data in a status buffer corresponding to the $j^{th}$ iterative computing task, and load status data of a $(j+M)^{th}$ computing task into a cleared status buffer, wherein the $j^{th}$ iterative computing task is an earliest iterative computing task in an iterative computing task currently corresponding to the M status buffers.

8. The apparatus according to claim 7, wherein the writeback circuit is further configured to:

before the status data of the $(j+M)^{th}$ computing task is loaded into the cleared status buffer, forbid sending a computation result of a $(j+M-1)^{th}$ iterative computing task to the status buffer corresponding to the $(j+M)^{th}$ iterative computing task; and after the status data of the $(j+M)^{th}$ computing task is loaded into the cleared status buffer, allow sending the computation result of the $(j+M-1)^{th}$ iterative computing task to the status buffer corresponding to the $(j+M)^{th}$ iterative computing task.

9. The apparatus according to claim 1, wherein the graph computing instruction comprises a computation end instruction; and each status buffer is further configured to: in response to determining that computation of an $N^{th}$ iterative computing task in the N iterative computing tasks is completed, clear, based on the computation end instruction, status data of an iterative computing task that exceeds the $N^{th}$ iterative computing task, and exit a loop.

10. A method, applied to an apparatus, wherein the apparatus comprises at least one processing engine (PE) and an instruction buffer, each of the at least one PE comprises M status buffers, an arbitration logic circuit, and X operation circuits, Mis an integer greater than 1, X is an integer greater than 1, and each of the M status buffers stores status data of one iterative computing task, wherein the one iterative computing task is one of N iterative computing tasks comprised in a graph computing task, N is an integer greater than 1, the graph computing task comprises P graph computing instructions, and the status data of the one iterative computing task comprises input data of the P graph computing instructions in a corresponding iterative computing task, and wherein the instruction buffer is configured to store the P graph computing instructions, wherein the N iterative computing tasks share the P graph computing instructions, and the method comprises:

determining, based on the status data in each of the M status buffers by using the arbitration logic circuit, L graph computing instructions to be executed in a current clock cycle;

allocating the L graph computing instructions to the X operation circuits, wherein the L graph computing instructions are instructions respectively corresponding to T iterative computing tasks, the N iterative computing tasks comprise the T iterative computing tasks, and both L and T are integers greater than or equal to 1 and less than or equal to X; and executing, by using each of the X operation circuits, a graph computing instruction allocated by the arbitration logic circuit.

11. The method according to claim 10, wherein the determining, based on status data in the M status buffers by using the arbitration logic circuit, L graph computing instructions to be executed in a current clock cycle, and allocating the L graph computing instructions to the X operation circuits comprises:

monitoring, by using the arbitration logic circuit, whether the input data that is of the P graph computing instructions in the corresponding iterative computing task and that is in the M status buffers is ready; selecting, from graph computing instructions whose current input data is ready, L graph computing instructions corresponding to the earliest T iterative computing tasks in the corresponding iterative computing task, wherein one or more graph computing instructions are selected from one iterative computing task; and allocating, from the instruction buffer, the L graph computing instructions to L operation circuits in the X operation circuits, wherein one operation circuit corresponds to one graph computing instruction.

12. The method according to claim 10, wherein the at least one PE further comprises a writeback circuit, the X operation circuits are separately connected to the writeback circuit, and the method further comprises:

sending, to the writeback circuit by using the X operation circuits, a computation result obtained by executing the graph computing instruction.

13. The method according to claim 12, wherein the graph computing instruction comprises an intra-iteration graph computing instruction, the intra-iteration graph computing instruction carries a result address, and the method further comprises:

sending, by using the writeback circuit, an $i^{th}$ iterative computation result to a result address in a status buffer corresponding to an $i^{th}$ iterative computing task, wherein a value range of i is a positive integer less than or equal to N, and the $i^{th}$ iterative computation result is a result obtained by executing the intra-iteration graph computing instruction in the $i^{th}$ iterative computing task in the N iterative computing tasks.

14. The method according to claim 12, wherein the graph computing instruction comprises a cross-iteration graph computing instruction, the cross-iteration graph computing instruction carries a result address and a cross-iteration identifier, and the method further comprises:

sending, based on the cross-iteration identifier by using the writeback circuit, an $i^{th}$ iterative computation result to a result address in a status buffer corresponding to an $(i+1)^{th}$ iterative computing task, wherein a value range of i is a positive integer less than or equal to N−1, and the $i^{th}$ iterative computation result is a result obtained by executing the cross-iteration graph computing instruction in the $i^{th}$ iterative computing task in the N iterative computing tasks.

15. The method according to claim 13, wherein in response to determining that computation results corresponding to a plurality of iterative computing tasks need to be separately written back to corresponding status buffers, preferentially writing, by using the writeback circuit, a computation result corresponding to an earlier-iterated iterative computing task back to a status buffer corresponding to the iterative computing task with the earlier iteration.

16. The method according to claim 12, wherein the graph computing instruction comprises an iterative window movement instruction, and the method further comprises:

in response to determining that computation of a graph computing instruction in a $j^{th}$ iterative computing task is completed, clearing, based on the iterative window movement instruction by using the M status buffers, status data in a status buffer corresponding to the $j^{th}$ iterative computing task, and loading status data of a $(j+M)^{th}$ computing task into a cleared status buffer, wherein the $j^{th}$ iterative computing task is an earliest iterative computing task in an iterative computing task currently corresponding to the M status buffers.

17. The method according to claim 16, wherein the method further comprises:

before the status data of the $(j+M)^{th}$ computing task is loaded into the cleared status buffer, forbidding, by using the writeback circuit, sending a computation result of a $(j+M-1)^{th}$ iterative computing task to the status buffer corresponding to the $(j+M)^{th}$ iterative computing task; and after the status data of the $(j+M)^{th}$ computing task is loaded into the cleared status buffer, allowing, by using the writeback circuit, sending the computation result of the $(j+M-1)^{th}$ iterative computing task to the status buffer corresponding to the $(j+M)^{th}$ iterative computing task.

18. The method according to claim 10, wherein the graph computing instruction comprises a computation end instruction, and the method further comprises:

in response to determining that computation of an $N^{th}$ iterative computing task in the N iterative computing tasks is completed, clearing, based on the computation end instruction by using the M status buffers, status data of an iterative computing task that exceeds the $N^{th}$ iterative computing task, and exiting a loop.

19. A non-transitory computer-readable storage medium, coupled to at least one processor and storing programming instructions for execution by the at least one processor to cause an apparatus to perform operations, wherein the apparatus comprises at least one processing engine (PE) and an instruction buffer, each of the at least one PE comprises M status buffers, an arbitration logic circuit, and X operation circuits, Mis an integer greater than 1, X is an integer greater than 1, and each of the M status buffers stores status data of one iterative computing task, wherein the one iterative computing task is one of N iterative computing tasks comprised in a graph computing task, N is an integer greater than 1, the graph computing task comprises P graph computing instructions, and the status data of the one iterative computing task comprises input data of the P graph computing instructions in a corresponding iterative computing task, and wherein the instruction buffer is configured to store the P graph computing instructions, wherein the N iterative computing tasks share the P graph computing instructions, and wherein the operations comprising:

determining, based on the status data in the each of the M status buffers by using the arbitration logic circuit, L graph computing instructions to be executed in a current clock cycle;

allocating the L graph computing instructions to the X operation circuits, wherein the L graph computing instructions are instructions respectively corresponding to T iterative computing tasks, the N iterative computing tasks comprise the T iterative computing tasks, and both L and T are integers greater than or equal to 1 and less than or equal to X; and executing, by using each of the X operation circuits, a graph computing instruction allocated by the arbitration logic circuit.

20. The non-transitory computer-readable storage medium according to claim 19, wherein determining the L graph computing instructions to be executed in the current clock cycle, and allocating the L graph computing instructions to the X operation circuits comprises:

monitoring, by using the arbitration logic circuit, whether the input data that is of the P graph computing instructions in the corresponding iterative computing task and that is in the M status buffers is ready; selecting, from graph computing instructions whose current input data is ready, L graph computing instructions corresponding to the earliest T iterative computing tasks in the corresponding iterative computing task, wherein one or more graph computing instructions are selected from one iterative computing task; and allocating, from the instruction buffer, the L graph computing instructions to L operation circuits in the X operation circuits, wherein one operation circuit corresponds to one graph computing instruction.

* * * * *